US007127524B1

(12) United States Patent
Renda et al.

(10) Patent No.: US 7,127,524 B1
(45) Date of Patent: Oct. 24, 2006

(54) SYSTEM AND METHOD FOR PROVIDING ACCESS TO A NETWORK WITH SELECTIVE NETWORK ADDRESS TRANSLATION

(75) Inventors: Gregory L Renda, Saratoga, CA (US); Archibald L Cobbs, San Carlos, CA (US); Van Jacobson, Woodside, CA (US)

(73) Assignee: Vernier Networks, Inc., Mountain View, CA (US)

( * ) Notice: Subject to any disclaimer, the term of this patent is extended or adjusted under 35 U.S.C. 154(b) by 597 days.

(21) Appl. No.: 10/027,010

(22) Filed: Dec. 21, 2001

Related U.S. Application Data

(60) Provisional application No. 60/290,134, filed on May 10, 2001, provisional application No. 60/259,356, filed on Dec. 29, 2000.

(51) Int. Cl.
G06F 15/16 (2006.01)
(52) U.S. Cl. .................. 709/245; 709/249; 709/223
(58) Field of Classification Search ........ 709/238–245, 709/208, 229, 231–236, 219–228; 710/33; 725/119; 726/15; 370/351, 229, 254, 389, 370/401; 455/439; 715/740
See application file for complete search history.

(56) References Cited

U.S. PATENT DOCUMENTS

| | | | | | |
|---|---|---|---|---|---|
| 6,006,272 | A | * | 12/1999 | Aravamudan et al. | 709/245 |
| 6,023,563 | A | * | 2/2000 | Shani | 709/249 |
| 6,128,666 | A | * | 10/2000 | Muller et al. | 709/238 |
| 6,154,839 | A | * | 11/2000 | Arrow et al. | 713/154 |
| 6,292,838 | B1 | * | 9/2001 | Nelson | 709/236 |
| 6,370,605 | B1 | * | 4/2002 | Chong, Jr. | 710/33 |
| 6,434,627 | B1 | * | 8/2002 | Millet et al. | 709/245 |
| 6,490,259 | B1 | * | 12/2002 | Agrawal et al. | 370/331 |
| 6,502,130 | B1 | * | 12/2002 | Keeler et al. | 709/223 |
| 6,539,473 | B1 | * | 3/2003 | Hubacher et al. | 713/2 |
| 6,591,304 | B1 | * | 7/2003 | Sitaraman et al. | 709/238 |
| 6,643,269 | B1 | * | 11/2003 | Fan et al. | 370/254 |
| 6,654,792 | B1 | * | 11/2003 | Verma et al. | 709/208 |
| 6,747,675 | B1 | * | 6/2004 | Abbott et al. | 715/740 |
| 6,748,439 | B1 | * | 6/2004 | Monachello et al. | 709/229 |
| 6,801,960 | B1 | * | 10/2004 | Ericson et al. | 710/33 |
| 6,832,322 | B1 | * | 12/2004 | Boden et al. | 726/15 |
| 6,870,840 | B1 | * | 3/2005 | Hill et al. | 370/389 |
| 6,912,223 | B1 | * | 6/2005 | Sloane | 370/401 |
| 6,912,567 | B1 | * | 6/2005 | Allard et al. | 709/223 |
| 6,981,265 | B1 | * | 12/2005 | Rees et al. | 719/313 |
| 6,982,967 | B1 | * | 1/2006 | Leung | 370/328 |

(Continued)

OTHER PUBLICATIONS

Network Working Group C. Finseth—Request For Comments ; www.tzi.de/~cabo/pdfrfc/rfc1439.txt.pdf.*

(Continued)

*Primary Examiner*—Thong Vu
(74) *Attorney, Agent, or Firm*—Innovation partners; Charles E. Gotlieb

(57) ABSTRACT

A system and method controls access to a network. The system and method intercepts communications received from, and responses and other communications to, devices on the network. Communications may be forwarded to their intended destination if the sending device has sufficient privileges to do so, or the communications may be handled by the system and method or forwarded to a different destination (e.g. a printer nearby the access point to which the user is communicating) using network address translation or redirection. Responses are received and stored by the system and method and may be forwarded to the device that sent the original communication, either directly or via a different device that requests the stored communications using a tunnel.

26 Claims, 14 Drawing Sheets

U.S. PATENT DOCUMENTS

| | | | | |
|---|---|---|---|---|
| 2002/0010783 A1* | 1/2002 | Primak et al. | | 709/228 |
| 2002/0022483 A1* | 2/2002 | Thompson et al. | | 455/439 |
| 2002/0026525 A1* | 2/2002 | Armitage | | 709/238 |
| 2002/0032766 A1* | 3/2002 | Xu | | 709/223 |
| 2002/0075844 A1* | 6/2002 | Hagen | | 370/351 |
| 2002/0107971 A1* | 8/2002 | Bailey et al. | | 709/231 |
| 2002/0147800 A1* | 10/2002 | Gai et al. | | 709/221 |
| 2003/0009561 A1* | 1/2003 | Sollee | | 709/227 |
| 2003/0051026 A1* | 3/2003 | Carter et al. | | 709/224 |
| 2003/0069973 A1* | 4/2003 | Ganesan et al. | | 709/226 |
| 2003/0093563 A1* | 5/2003 | Young et al. | | 709/245 |
| 2003/0106067 A1* | 6/2003 | Hoskins et al. | | 725/119 |
| 2003/0126233 A1* | 7/2003 | Bryers et al. | | 709/219 |
| 2003/0229809 A1* | 12/2003 | Wexler et al. | | 713/201 |
| 2004/0001433 A1* | 1/2004 | Gram et al. | | 370/229 |

OTHER PUBLICATIONS

Call Processing Language Framework and Requirements—Lennox, Schulzrinne (2000) (Correct) (4 citations) by informing the request originator of an alternate address to which the request should be sent. proxy www.cs.columbia.edu/~lennox/draft-ietf-ipt.*

Process Algebra-Guided Design of Java Mobile Network..—Carbone, Coccia.. (2001) www.doc.ic.ac.uk/~maffeis/edpiscript.p.*

* cited by examiner

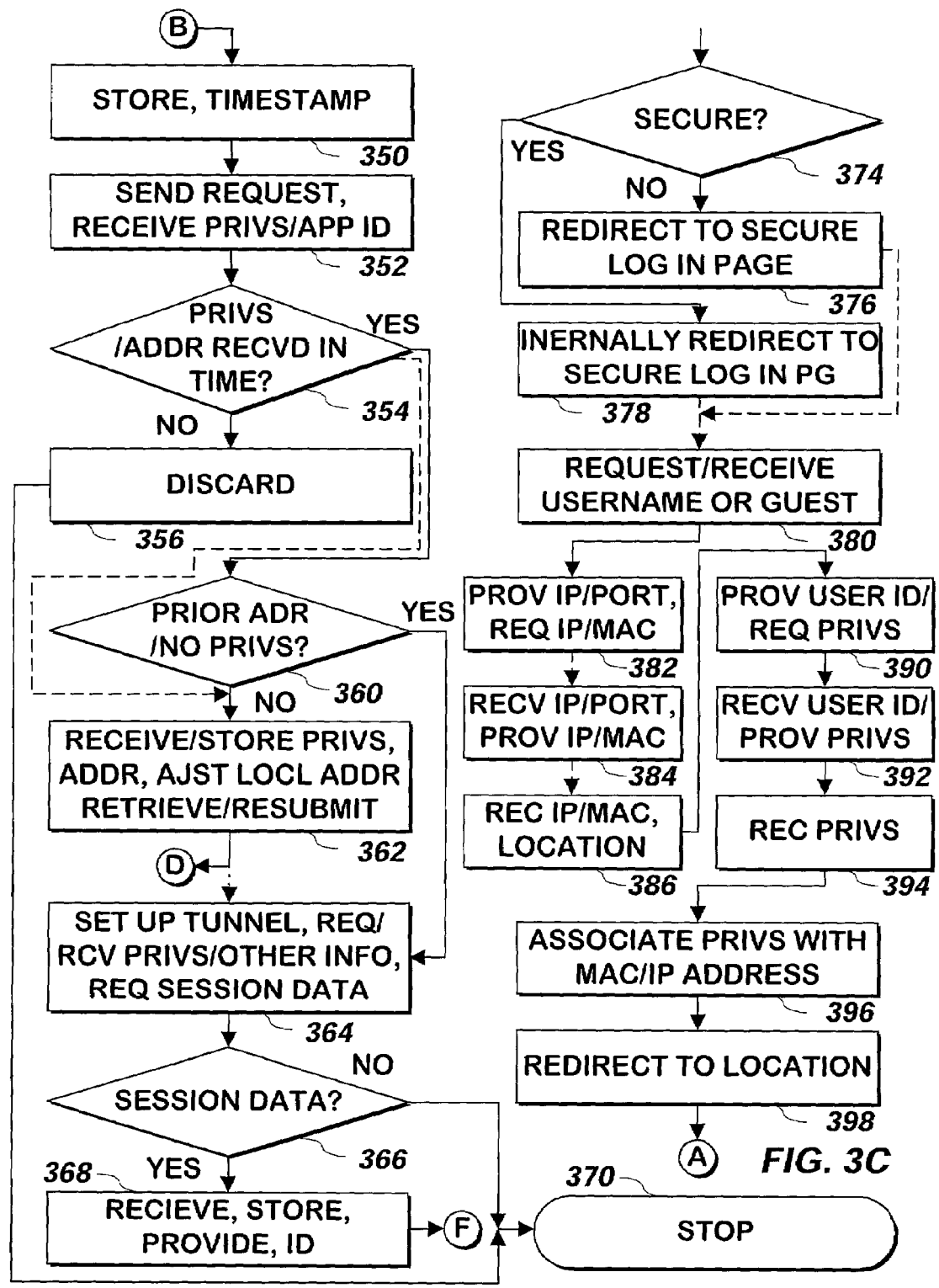

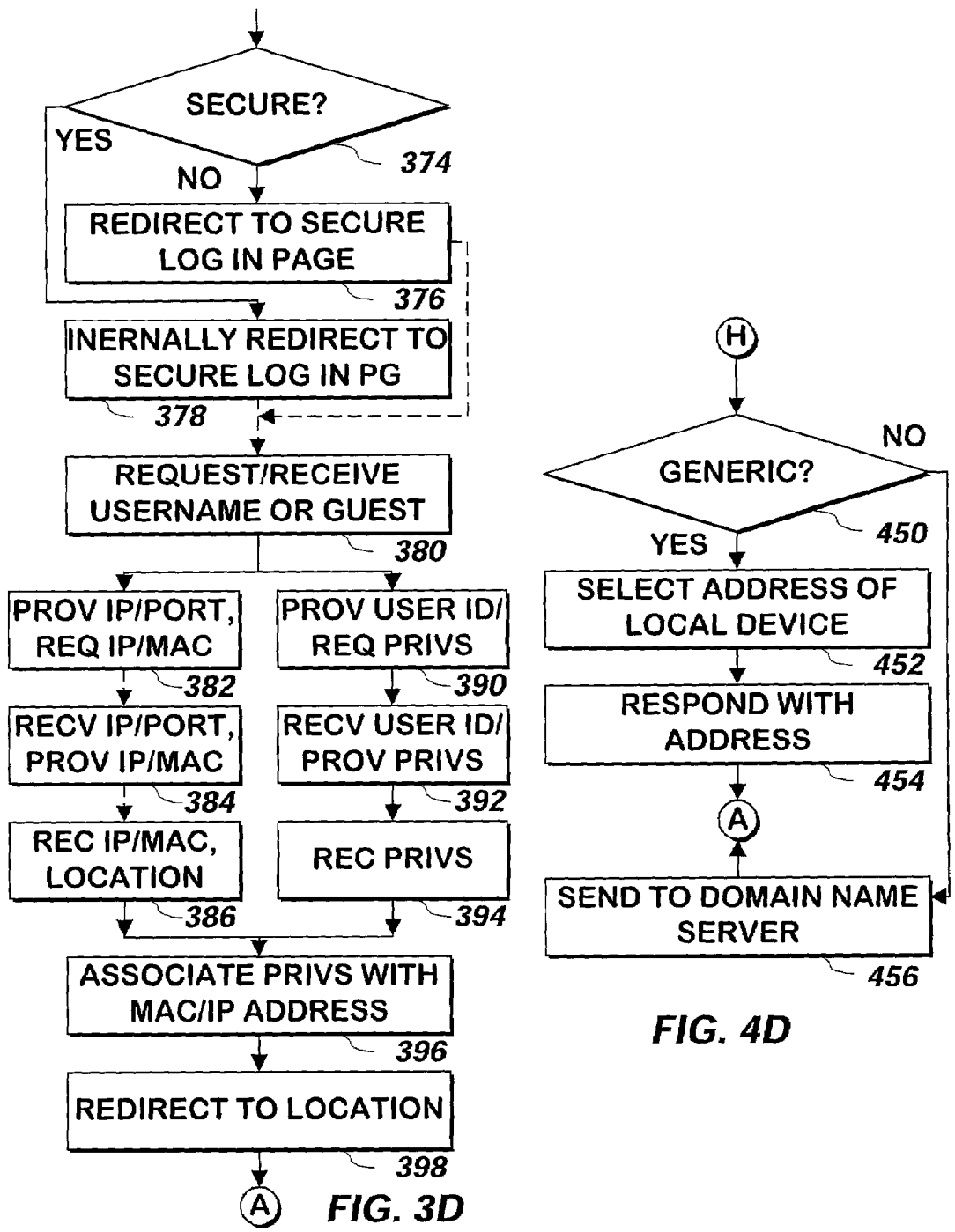

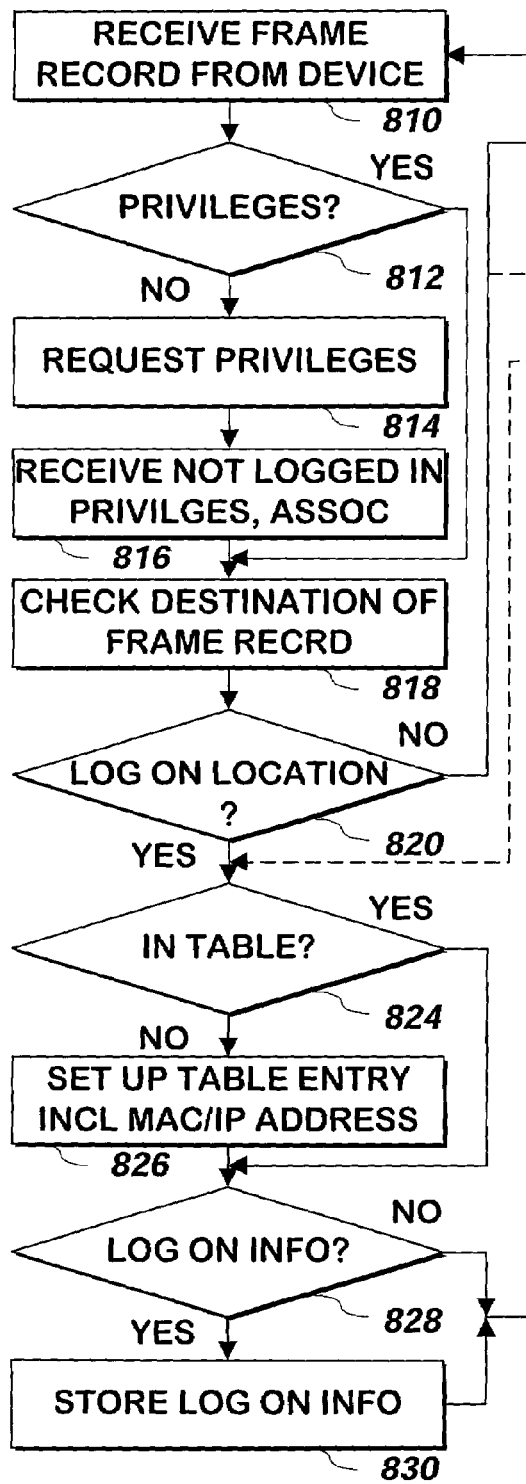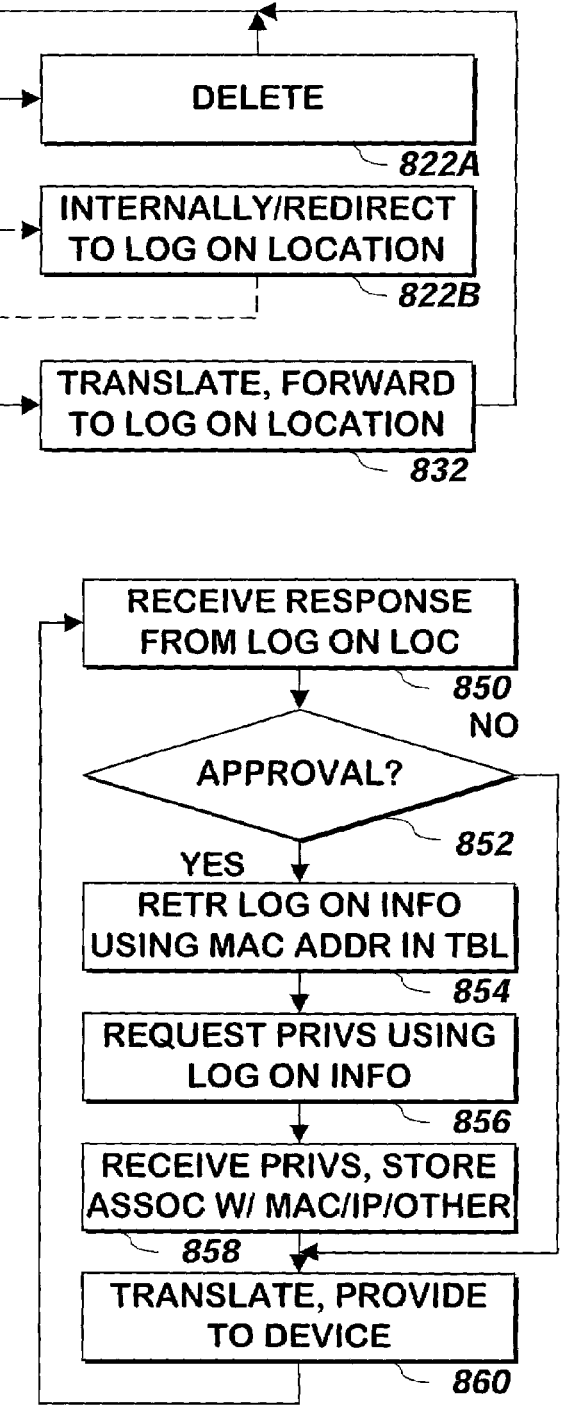
*FIG. 8A*
*FIG. 8B*

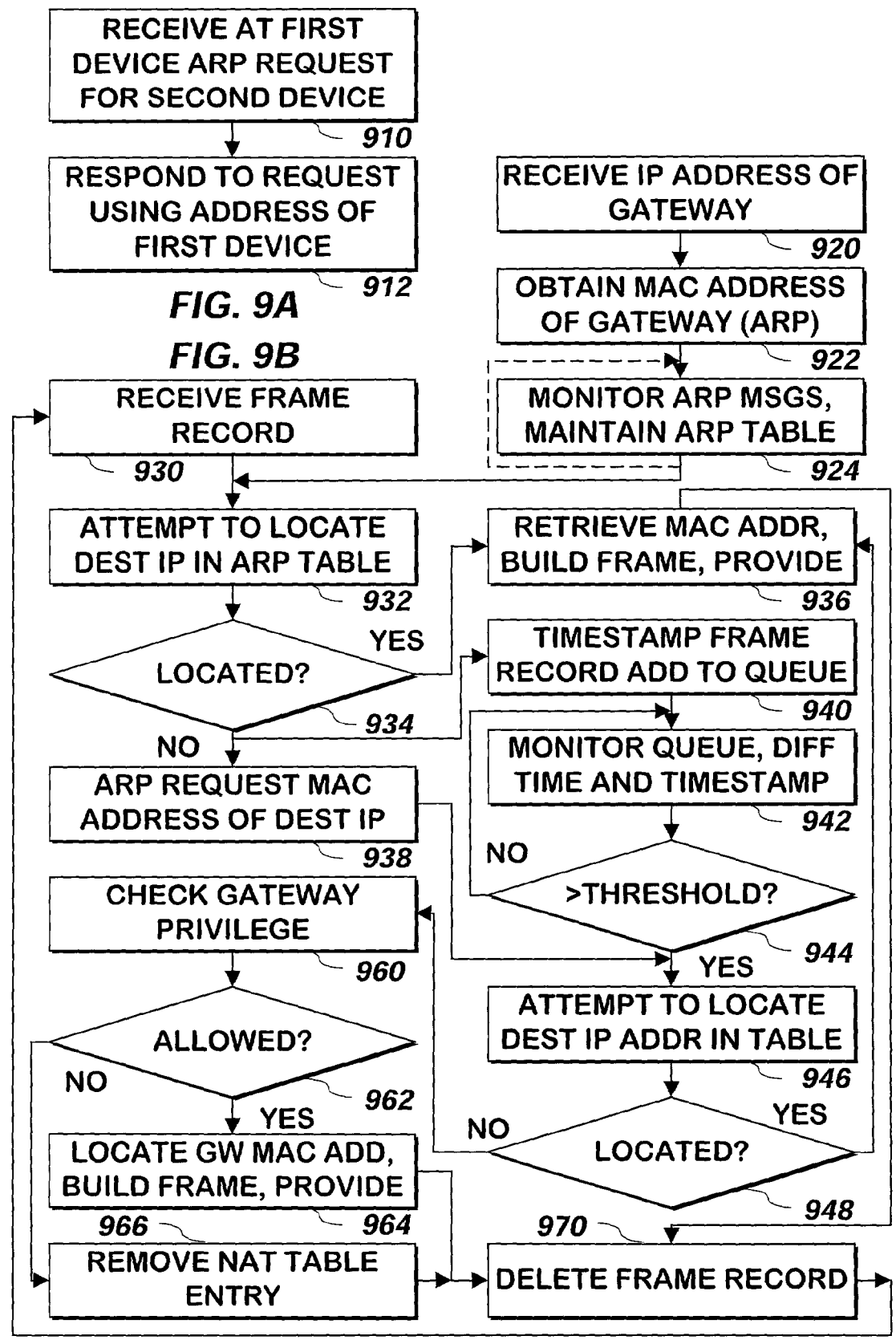

SYSTEM AND METHOD FOR PROVIDING ACCESS TO A NETWORK WITH SELECTIVE NETWORK ADDRESS TRANSLATION

RELATED APPLICATIONS

This application claims the benefit of U.S. Provisional Application No. 60/259,356 entitled, "METHOD AND APPARATUS FOR PROVIDING ACCESS TO A NETWORK" filed on Dec. 29, 2000 by Archibald L. Cobbs, Gregory L. Renda, and Van Jacobson U.S. Provisional Application No. 60/290,134 entitled, "METHOD AND APPARATUS FOR PROVIDING ACCESS TO A NETWORK" filed on May 10, 2001 by Archibald L. Cobbs, Gregory L. Renda, and Van Jacobson and is related to the following copending U.S. applications: U.S. application Ser. No. 10/027,455 entitled, "System and Method for Processing Domain Name Service Queries for a Network" filed on Dec. 21, 2001 by Van Jacobson, Archibald L. Cobbs, and Gregory L. Renda, U.S. application Ser. No. 10/027,534 entitled, "System and Method for Processing DHCP Messages for a Network" filed on Dec. 21, 2001 by Van Jacobson, U.S. application Ser. No. 10/027,011 entitled, "System and Method for Providing Access To A Network According to User Privileges" filed on Dec. 21, 2001 by Archibald L. Cobbs, Gregory L. Renda, and Van Jacobson, and U.S. application Ser. No. 10/027,822 entitled, "System and Method for Forwarding Session Information as a User Moves Around a Network" filed on Dec. 21, 2001 by Archibald L. Cobbs, Gregory L. Renda, and Van Jacobson, and each is hereby incorporated herein by reference in its entirety.

FIELD OF THE INVENTION

The present invention is related to communications equipment and software and more specifically to computer network equipment and software.

BACKGROUND OF THE INVENTION

Computers and other devices are connected to a network in order to communicate with destinations available to that network. Destinations available to a network may include peripheral devices, such as storage, printers, fax communication devices and the like, an internal Intranet, and destinations on the Internet such as web sites and FTP sites and the like. Each of these destinations may be made available to the network via a computer system attached to the network, via a direct connection to the network, or via another network.

If a computer system or other device is connected to a conventional network, the computer system or device can be configured to easily access destinations available to users of the network. For example, a technician can configure a workstation that is being attached to an Ethernet network to allow a user of the workstation to easily access destinations such as printers and file servers to which that user is supposed to have access. Destinations may be configured by a network administrator to grant or deny access to that computer system. Although such configuration is a time-consuming and error prone task, because the configuration of the computer system and destinations is set up and then often not changed for many months or years, this time-consuming and error-prone method of configuration is tolerated in order to maintain the security of the network.

In many networks, configuration is accomplished by assigning a workgroup to the computer system, installing drivers that operate certain peripheral devices, and then assigning names to the locations of those devices for ease of use. This makes it cumbersome to allow guest access (e.g. temporary access to a user who does not have a username for the network) to a network. Because the guest could compromise the security of the network, the lack of easy network access by a guest was viewed as a feature of the network, not a problem. A party who wired a computer into a network could be an intruder, and so the configuration process served as a barrier to such intruders. The fact that the relatively few guests who had a legitimate need to access the network required significant configuration resources to do so was seen as a minor problem compared with the problems that could be unleashed by a malevolent party with access to the network. Because such a party could learn the proper workgroup identifier and other configuration information from studying another computer system already configured for network access, the technique of using the configuration process as a form of security is not truly secure. Instead, the process acts as a sort of an inexpensive door lock: it's only protection is the nuisance it causes. However, because a guest would have required physical access to a facility and would have to physically connect the computer system to the network, the relatively low amount of network security was seen as adequate for the circumstances because of the physical access requirement.

Recently, facilities have started providing more public-type access to a network at various locations via access points such as network hubs or switches. For example, jacks coupled to a network hub may be available in a conference room, allowing users to connect to the network a portable, mobile or other type of computer system. A properly configured computer system can remain configured no matter which jack is used to connect to the network, so that if a user disconnects a laptop from a jack in his or her office and plugs it into a conference room jack, the computer will perform just as it did when the computer was in the office.

Access to a computer network need not be via a jack. A network may provide wireless access to computer systems wishing to connect to the network. Wireless access allows a computer having the proper transceiver to access the network via wireless communication with a wireless access point, which is a transceiver that is in communication with the network. The computer and access point communicate via a wireless protocol such as the conventional IEEE 802.11 protocol. A user can bring his or her laptop into a conference room and the laptop will be connected to the network via the wireless access point serving the conference room without any physical connection.

However, there are several problems associated with providing public access to a network. First, organizations may not want to provide guests (e.g. users who do not have a user identifier identifying the user to the network) access to network destinations limited only by the configuration ability of the guest. Otherwise, a guest could connect to a network and then use facilities of that network such as printers or access sensitive material stored on network servers or other computers on the network. Another reason it is undesirable to allow a guest to connect to a network is the fact that many networks such as Ethernet broadcast their communications to all devices, and those devices must discard communications not intended for that device. A guest could connect a computer system to the network, and have access to all communications flowing over the network. If the guest recorded all such communications, the security of sensitive information could be compromised.

There are other problems for even legitimate users and authorized guests. First, access to the same destinations the user has at one location may not meet the user's needs at another location. For example, a user in a conference room on the other side of a corporate campus may wish to use a printer closer to the access point than the printer near his or her office that the user's computer is configured to easily use. Second, if guests wish to connect to a network a computer system or other device that is not properly configured, that computer system or device will be denied access to the entire network, and cannot use destination such as printers or the Internet that the operator of the network would otherwise readily grant the guest, but for the time consuming process of configuration. As a result, such configuration may be perceived to be not worth the effort due to the relatively short amount of time the user will be using the network and the configuration will not occur, or an inefficient use of a network administrator's resources will be used to configure the network and an inefficient use of a service technician's resources will be used to configure the guest's computer system to allow the guest to use certain capabilities of the network for a short period of time.

Another problem exists if the network access points use the 802.11 protocol. The 802.11 protocol does not provide transparent handoff from one access point to another if the access points are on different subnetworks. As a user moves from one access point to another access point, certain information transmitted to the user may never be received by the user.

Some network systems involved with providing access to a network utilize network address translation, or NAT. When a user sends a message to such network system, the network system intercepts the message, substitutes its own address and an assigned port number in place of the user's IP address and port number, and then forwards the message to the intended recipient. The network system maintains a table to allow it to match responses with its own IP address and the assigned port number to the original message sender's IP address and port number. When the response arrives, the network system performs the NAT process in reverse, and forwards the response to the IP source address specified in the original message. While this approach may be transparent to many users, it can interfere with the operation of certain software or mobile devices, for example, during certain sessions such as Telnet, virtual private networking (VPN) or IPSec sessions.

What is needed is a system and method that controls access to a network, allows guest access with only a limited amount of configuration, does not provide access to all communications being made over a network, allows simple access to location-related destinations such as nearby printers, allows a user to move between any set of access points without significant loss of communications, and can avoid network address translation interference.

SUMMARY OF INVENTION

A system and method resides between a network access point and the network and intercepts communications to and from the network access point. Using the MAC address of the user's computer system communication device, the destination address of the communication and a database of MAC addresses and permissions, the system and method determines whether a user of the device having that MAC address has permission to access a destination to which a communication has been sent. If the user has such permission, the system and method determines whether the system and method itself can process the communication and if so, it processes the communication itself and sends any response to the user without knowledge of the user or the user's computer system. If not, the system and method sends the communication as a communication from the system and method, receives the response, and forwards it to the user's computer system via the network access point. The system and method may redirect certain communications to a different destination, such as one that may be intended, but for which the specific address is not known, for example, by intercepting domain name service queries and either responding to them under certain circumstances or forwarding them to domain name servers capable of responding to them. Because the system and method intercepts communications from the network and forwards to the network access point only communications to those users it believes are in communication with that network access point, a user's computer attempting to record all communications on the network will only record communications to and from the network access point, which may only be a small subset of the communications flowing over the network. If the user moves to a different access point before receiving and acknowledging a communication sent to that user, the system and method stores and forwards the communication it receives for that user to the new access point to which the user is communicating, allowing the user to receive the communication. To further prevent conflicts, certain users may be designated to cause some or all communications sent from these users to contain an identifier such as an IP address of the user instead of a translated address. Such users can receive an IP address via a DHCP server, while other users may simply use whatever IP address they were using previously, or receive an address from a block of addresses reserved for that purpose. Subsequent session communications may be routed through the original device used to initiate the session, to avoid software conflicts that could arise if subsequent communications arrive from a different device. The system and method allows easy configuration and access to certain devices such as printers located nearby the network access point to which the user is in communication without complicated configuration procedures or knowledge of names or addresses of the nearby devices. If the device from which the communication is sent is not logged in to the system and method via the MAC address of the user's network interface, the system and method allows the user to identify himself as an authorized user or identify himself as a guest and automatically grants limited use of the network to such guests, such limited use being preconfigured by a system administrator without requiring configuration for each guest.

BRIEF DESCRIPTION OF THE DRAWINGS

FIG. 3B is a flowchart illustrating a method of retrieving privileges and session information for a user according to one embodiment of the present invention.

FIG. 3C is a flowchart illustrating a method of logging in a user according to one embodiment of the present invention.

FIG. 3D is a flowchart illustrating a method of logging in a user according to another embodiment of the present invention.

FIG. 4D is a flowchart illustrating a method of responding to a DNS request according to one embodiment of the present invention.

FIG. 8A is a flowchart illustrating a method of intercepting frames from a device to allow log in using log on information intended for a log on location according to one embodiment of the present invention.

FIG. 8B is a flowchart illustrating a method of intercepting frames to a device to allow log in using log on information intended for a log on location according to one embodiment of the present invention.

FIG. 9A is a flowchart illustrating a method of responding to an address resolution protocol request according to one embodiment of the present invention.

FIG. 9B is a flowchart illustrating a method of providing a packet to a network according to one embodiment of the present invention.

DETAILED DESCRIPTION OF A PREFERRED EMBODIMENT

Figure 1:
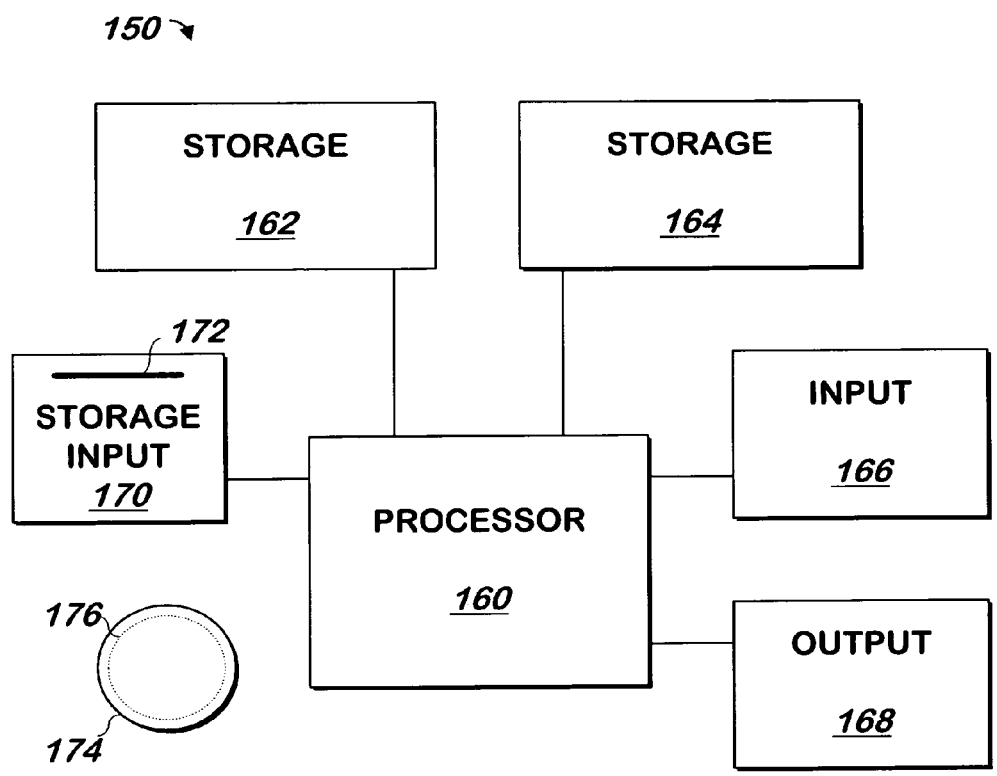
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running the Windows (95, 98 or NT) operating system commercially available from Microsoft Corporation of Redmond Wash. or running the FreeBSD operating system commercially available at the web site of FreeBSD.org, or a Macintosh computer system running the MacOS commercially available from Apple Computer Corporation of Cupertino, Calif. and the Netscape browser commercially available from Netscape Computer Corporation of Mountain View, Calif. although other systems may be used.

Figure 2A:
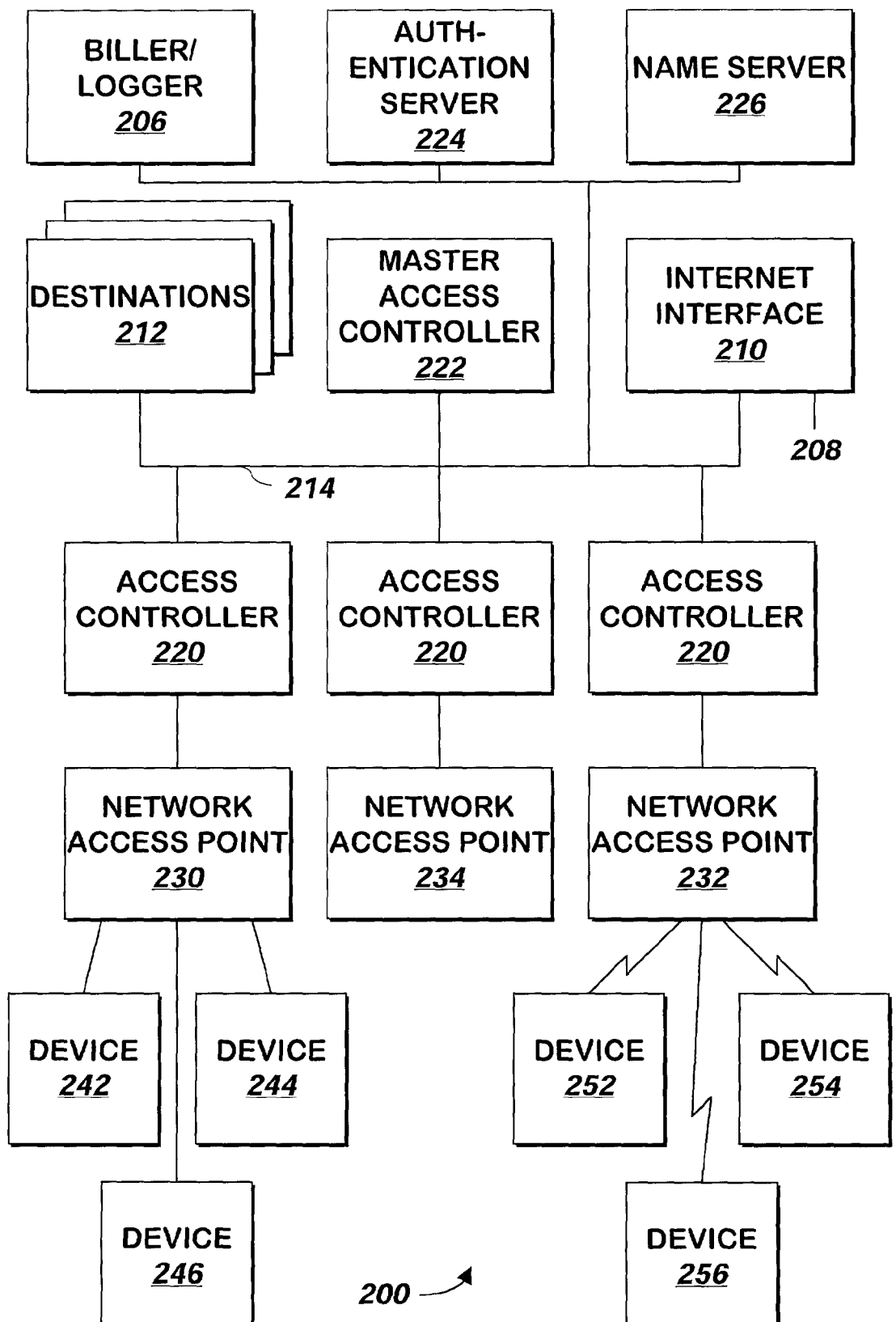
FIG. 2A is a block schematic diagram of a computer network including several systems for providing access to a network according to one embodiment of the present invention.

Referring now to FIG. 2A, a system 200 of devices 242–256 in communication with a computer network 214 is shown according to one embodiment of the present invention. Computer network 214 is any conventional computer network equipment and cabling such as a conventional Ethernet network switches, hubs and cabling, although other network equipment and cabling may be used. Coupled to network 214 via access controllers 220 described below are conventional network access points 230, 232, 234, which may include conventional Ethernet hubs and switches, conventional wireless access points such as those capable of communication using the conventional 802.11 protocol, as well as any other conventional network communications equipment of all types. Devices 242–256 may include any or all of conventional computer systems, PDAS, cell phones, Internet appliances, pagers, handheld computer systems or any other device capable of communication with network access points 230–234. In one embodiment, devices 242–246 are in communication with network access point 230 via conventional physical links such as conventional category 5 wiring, conventional coax wiring, conventional optical cables or any other form of wired or cabled communication. Devices 252–256 are in communication with network access point 232 via antennae and any conventional wireless protocol such as 802.11. Network access point 234 is similar to network access point 232 in that it may receive wireless communications from devices 252–256, which are initially not in communication with it for purposes of example. Although only three of each type of the devices 242–246 and 252–256 are shown coupled to only three network access points 230–234, any number of devices 242–256 and access points 230–234 may be used according to the present invention.

Attached to the network 214 is Internet interface 210. Internet interface 210 is a conventional Internet interface that acts as a gateway between the network 214 and the Internet coupled to input/output 208 and may include any form of conventional communication equipment, including firewall equipment, capable of coupling a network with the Internet. In one embodiment, internet interface 210 is an interface or gateway to any other form of network, such as a network other than network 214.

In addition to destinations on the Internet such as websites, ftp sites, Telnet sites, streaming audio sites, and peers, the network 214 provides access to destinations 212 coupled to the network 214. Destinations 212 include conventional storage devices such as disk storage devices that may be part of a server, printers, fax servers, modems, scanners, and any other form of device that may communicate with any other device coupled to network 214 or system 200, and may include local services such as an intranet. Destinations 212 and Internet interface 210 communicate with network 214 via other network access points such as switches, hubs or other network equipment that is not shown to avoid cluttering the Figure. In one embodiment, destinations available to the network 214 include devices 242–256, although for purposes of example, such destinations are described as being part of destinations 212 when the device 242–256 is operating as a destination. In one embodiment, a destination 212 is any device to which the network has access that is capable or has the potential of receiving a communication from a device 242–256 in communication with the network 214.

According to the present invention, network access points 230–234 are coupled to the network 214 for communication with destinations 212 and Internet interface 210 via access controllers 220. As described in more detail below, because devices communicate with destinations 212 and Internet Interface 210 and other portions of the system 200 only via access controllers 220, access controllers 220 can grant and restrict access to destinations 212 and destinations reachable via Internet interface 210 by devices 242–256, manage quality of service and bandwidth allocated to devices, handle proxy and redirection services, perform other services and assist with coordination of communication as a device moves from one network access point 230, 232 or 234 to another 230, 232 or 234. Such movement would ordinarily be associated with moving among wireless network access points 232, 234 although movement among cabled network access points 230 can also be assisted by access controllers 220 as described in more detail below.

As described in more detail below, a system administrator defines whether and how users can access destinations 212 and destinations accessed via Internet interface 210 by assigning privileges in authentication server 224. Authentication server 224 may include a conventional authentication server, although portions of the authentication server may physically be located in master access controller 222. Authentication server 224 holds a master list of the privileges of all users recognized by system 200 as well as guest users. Master access controller 222 allows users to log in and requests from authentication server 224 the privileges for users who have logged in, stores those privileges for all users who are using the system 200 and provides those privileges to the access controller 220 corresponding to the network access point 230–234 with which the user is communicating (or master access controller 222 may store the privileges for all users and provide them to such access controller once authentication server 224 authenticates the user). As mobile users move from one access point 230–234 to another, the access controller 220 corresponding to that access point 230–234 requests the privileges for the user from master access controller 222 as described in more detail below. Sessions, such as Telnet, VPN or IPSec sessions, requested by a user are actually set up between the access controller 220 corresponding to the network access point 230–234 through which the user is communicating, and the session server and session communications are forwarded between the device 242–256 and the session server via the access controller 220. If the device 242–256 moves from one access point 230–234 to another 230–234, any sessions initiated at an access controller 220 continue to be handled by that access controller, which maintains the session and continues to forward session communications between the device 242–256 and the session server via the access controller 220 corresponding to the network access point 230–234 with which the device 242–256 is now communicating. If the user moves to another access point 230–234, the access controller 220 corresponding to that access point 230–234 will inform (either directly or indirectly) all of the access controllers that initiated a currently active session with that device 242–256 and those access controllers 220 forward session communications via that new access controller 220.

Although the Figure depicts access controllers 220 as being physically separate from the network access points 230–234, each controller 220 may be integrated into, and in communication with, a single network access point 230–234 or another network device. The Figure also depicts each network access point 230–234 as having its own access controller 220, although any other ratios of access controllers 220 to network access points 230–234 may be employed.

In one embodiment, a system administrator can use a browser to connect to authentication server 224 and define the privileges of users who will be using the system 200, although any other form of communication such as a command line interface may be used. Although privileges are described herein as being stored in authentication server 224, in another embodiment, privileges are stored by the system administrator in master access controller 222 instead of authentication server 224 via the same or similar arrangement and master access controller need not request such privileges from authentication server 224.

Certain privileges for a user have a target and an action. A target corresponds to what the user is trying to do, and the action is the desired result when a user attempts to contact the target. For example, if a user should not be allowed to access the IP address 10.1.2.3, the target would be "10.1.2.3" and the action would be "deny access".

Targets need not be limited to IP addresses: other types of targets such as port numbers or protocols are supported as targets by the present invention.

Actions can include deny access as described above, but may also include "redirect", "internally redirect", "grant", "grant with limited access", "grant if sufficient conditions are met". A system administrator can define default actions for a user, and then define the exceptions to that action. For example, a user may have a default action of "grant" with a set of exceptions such as denying access to individual sites on the Internet that display pornographic material.

Other privileges have to do with whether network address translation should occur as described below. A system administrator may enable or disable network address translation using authorization server 224. Network address translation may be disabled for all communications from certain users, all communications to or from users who log in during a specified period, users who log into a certain network access point or a group of network access points 230–234 or any combination of these. When network address translation is disabled, the user is said to be running in "real IP mode", because the actual IP address of the device 242–256 being used by the user is sent in the direction of the network 214 via a network input/output of the access controller by the access controller 220 with communications from that user. As described below, when real IP mode is not enabled or not enabled under the conditions in which the communication is being sent, communications from a user are translated using conventional network address translation techniques and the IP address and the network address of the device 242–256 being used by the user is not sent in the direction of the network 214 by access controller 220. In this manner, network address translation and real IP mode may be selected or selected under conditions specified by the system administrator.

In one embodiment, a system administrator can define the privileges of a class of users and assign a user to the class. The individual privileges assigned to a user will take precedence over the privileges of the class when determining actions to take when the user attempts to use the target. This allows the system administrator to define the privileges of the class, and assign users to the class, but override the privileges with respect to certain users. In one embodiment, classes may be hierarchical, with privileges of a descendant class having the privileges of the parent class, with conflicts resolved in favor of the descendant class.

In one embodiment, authentication server 224 (or master access controller 222) receives the privileges for each user and any conditions under which the privileges apply or do not apply (or an assignment of a user to a class defining the privileges) along with a username and an optional password that the user will use to identify himself or herself to system 200 and stores the privileges indexed by the username in a conventional B-tree data structure, although other data structures including hash tables and binary trees may be used. The username and password may be any form of one or more identifiers that can identify the user.

Figure 2B:
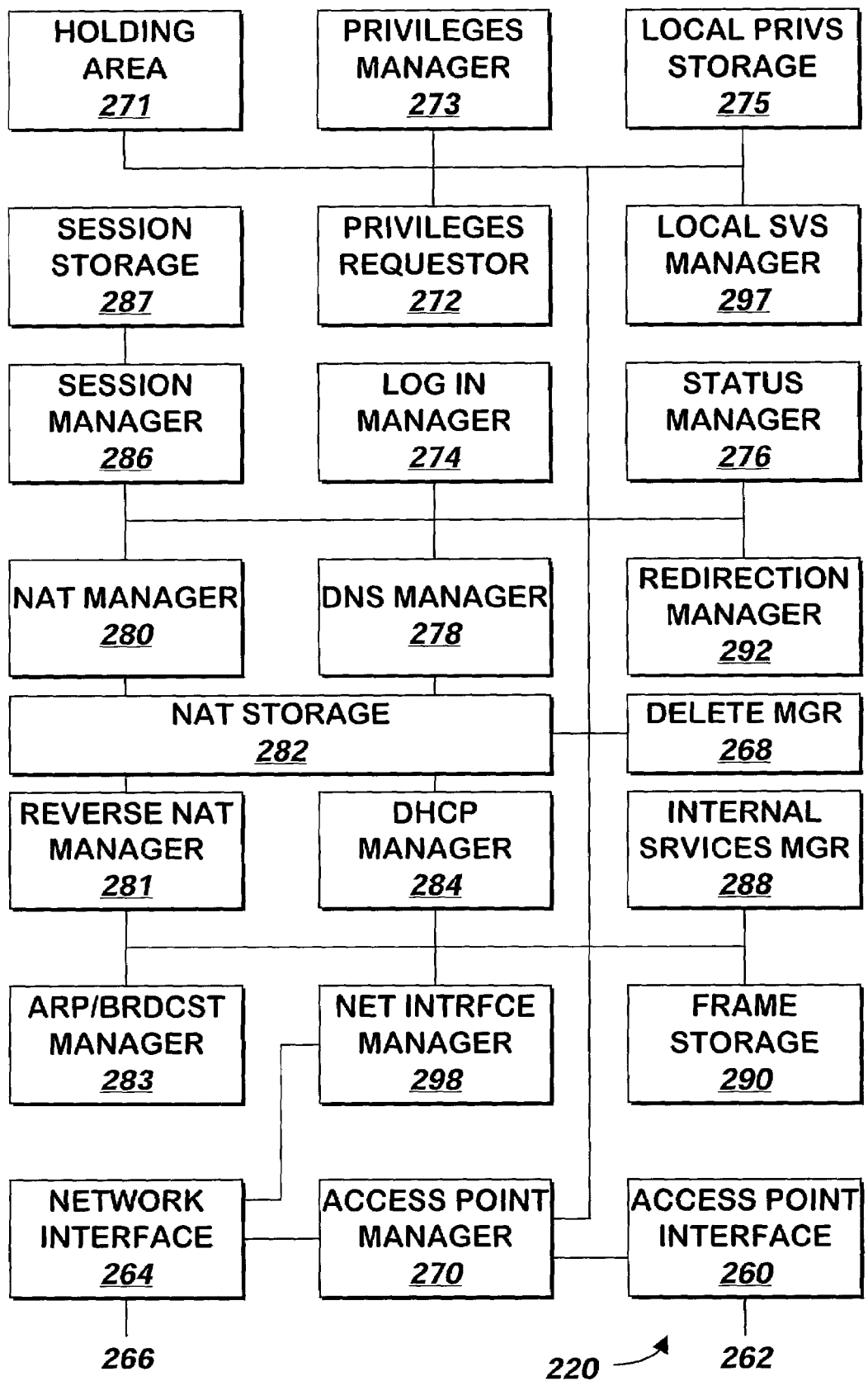
FIG. 2B is a block schematic diagram of a system for providing access to a network of FIG. 2A according to one embodiment of the present invention.

An access controller 220 of FIG. 2A is shown in more detail in FIG. 2B according to one embodiment of the present invention. Referring now to FIGS. 2A and 2B, when a user attempts to communicate with another portion of the system 200 using a network access point 230–234, the network access point 230–234 will attempt to send the communication in the direction of the network 214, but this communication will be intercepted by the access controller 220 to which it is coupled via a device input/output of the access controller 220. In one embodiment, this communication is a conventional Ethernet frame that uses the TCP/IP protocol, and such embodiment is used throughout the description below, although other forms of encapsulations and protocols such as IPX may be used by the present invention.

Access point interface 260 receives the communication via input/output 262, extracts the payload of the frame and passes the MAC address from the header of the frame and the payload to access point manager 270. Access point manager 270 extracts the packet header and the packet contents and builds a frame record for the frame containing the MAC address, and from the packet header, the source and destination IP addresses, the source and destination ports, the protocol, the flags, the sequence number and the acknowledgment number, and the TCP data contents of the packet and stores the frame record it builds in a frame record buffer in frame storage 290 and places a pointer to the frame record at the end of a privileges queue in frame storage 290, which is any conventional storage device, such as conventional memory or disk storage. In one embodiment, either access point interface 260 or access point manager 270 or both perform conventional techniques required by the networking system or protocol such as responding to status messages, checking the parity of the frame or packet, etc.

A MAC address identifies the device sending the frame. The present invention will operate with any device identifier other than a MAC address as well as it operates with MAC addresses.

As described herein, a pointer to each frame record is passed from one queue to another in one embodiment, with each queue being in frame storage 290. Transferring a frame record pointer from one queue to another may or may not involve physically transferring the frame record pointer, as pointers may be marked as being in a queue and unmarked as required. Also, other embodiments may not use queues, but may physically or logically pass the some or all of the frame record pointer or the frame record itself, for processing as described below.

Privileges manager 273 monitors the privileges queue in frame record storage 290 and if it locates a pointer to a frame record at the head of the queue, it removes the pointer from the queue, reads the frame record corresponding to the pointer and identifies whether a privileges record for a device having the MAC address is stored locally in access controller 220.

Privileges manager 273 attempts to locate in a set of privileges records it maintains in privileges storage 275 a privileges record associated with the MAC address in the frame record using a B-Tree of privileges in local privileges storage 275.

If the privileges are located in local privileges storage 275, privileges manager 273 will retrieve the privileges and identify the action associated with the target in the frame (or if the target is not located, privileges manager 273 will use the default action).

In one embodiment, privileges manager 273 first identifies whether the destination IP address and port number is on the list of destinations for which the action is "do not allow". In such embodiment, all such destination IP addresses (or addresses/filters) and port numbers (or port numbers/filters) are run through a part of privileges manager 273 that determines if the destination IP address and port is on the list of do not allow destinations for that user. Other criteria may be used to determine any action such as do not allow, including other characteristics of the frame record (protocol, size, etc) and/or conditions described below. That portion of privileges manager may be provided by commercially available programs such as BPF commercially available from FreeBSD of Walnut Creek, Calif. or the FreeBSD project of Gresham Oreg. If the destination IP address and port number is not allowed, privileges manager 273 sends the pointer to the frame record to a delete frame queue which is monitored by delete manager 268, which deletes the frame record from frame storage 290 and releases the pointer.

If the action is "allow", privileges manager 273 places the pointer to the frame onto the end of a NAT queue in frame storage 290. If the action is "internally redirect" or "redirect", privileges manager 273 places the destination IP address, port and protocol to which the packet should be redirected and an indicator of the action into the frame record and places the pointer onto the end of a redirection queue in frame storage 290. If the action is "internally process", privileges manager 273 places the frame pointer onto an internal services queue in frame storage 290.

If any action has a condition associated with the action in the privileges record retrieved, privileges manager 273 determines if the condition is met. In one embodiment, such conditioned privileges may have one action if the condition is met and another action otherwise, or the default action may be used, or the not allowed action may be used if the condition is not met. Conditions may include any form of status such as time of day, whether the user supplied a credit card at log in, or a credit card number or authorization to charge any other form of financial account such as a bank account or a customer account for which a bill is sent, is on file or otherwise has been arranged, domain to which the user is logged in, number of users logged into access controller 220 or master access controller 222 or any other status as described in more detail below. Access controllers may be assigned a type or location and the type or location of the access controller 220 through which the user is currently communicating may be used as a condition. Privileges manager 273 identifies the proper action based on whether the condition in the privileges record is true. To make this determination, privileges manager 273 may check internal status (e.g. number of sessions open as indicated by the NAT table in NAT storage 282) or may communicate with a destination 212 or destination via Internet interface 210.

In one embodiment, an action may be "handle at low priority". In such embodiment, privileges manager 273 marks the frame record as having a low priority status and NAT manager will place this status in the corresponding entry in the NAT table in NAT storage 282 as described in more detail below. NAT manager 280 or reverse NAT manager 281 or both will identify frame records that correspond to entries in the NAT table so marked, and store them for a period of time before sending them to reduce the frequency of such frame records. Other methods of restricting the communication for such frame records, such as priority queuing, may also be employed, whereby NAT manager 280 and/or reverse NAT manager 281 or other components of access controller 220 process frame records marked as having low priority after they process all frame records not marked as having low priority or process low priority frame records of a certain number or total size after a certain number or total size of high priority frame records have been processed. Any other conventional form of priority queuing may be employed, and any number of priority classes may be employed by the present invention.

Redirection manager 292 scans the redirection queue and if it locates a pointer at the head of the queue, it investigates the action in the frame record to which the pointer corresponds.

If the frame record contains an indication that the frame is to be internally redirected, redirection manager 292 instructs the browser to go to a new location, for example by swapping the destination port and IP address in the frame record with the redirected destination port and IP address in the frame record and placing the pointer to the frame record onto the NAT queue. Changing the destination IP address and port in this manner provides a type of redirection referred to as "internal redirection" and packets so redirected are referred to as "internally redirected". Packets will be internally redirected to the changed location without knowledge of the device 242–256 from which the packets originated. As described below, reverse NAT manager 281 will change the source IP address and port number in the opposite manner when packets are received in response to these packets so that they will appear to have been returned from the destination to which they were originally intended by the device 242–256.

If the frame record contains an indication that the frame is to be redirected, redirection manager builds a response frame in frame storage 290 by swapping the source IP address with the destination IP address in the frame corresponding to the pointer, swapping the source port with the destination port in the frame corresponding to the pointer. Redirection manager 292 then includes in the frame the URL of the destination to which the user is to be redirected that was placed into the frame record by privileges manager 273 as described above as part of an HTTP location command in the packet contents of the response frame. Redirection manager 292 then places the pointer to the response frame onto an access point queue in frame storage 290. In such embodiment, the target for the redirect action would ordinarily include a criteria that the original packet include an HTTP request in the packet contents of the frame record.

Access point manager 270 monitors the access point queue and when a pointer is detected at the head of the queue, access point manager 270 then retrieves the frame record, builds a packet from the frame record, provides the packet to access point interface 260, and provides the pointer to the delete frame queue for deletion of the frame by delete manager 268.

Access point interface 260 receives the packet and builds a frame containing the packet and sends the frame to the device or the devices to which the access point interface 260 is in communication.

In one embodiment, redirection may be used to allow access to an SMTP server for sending mail. Many SMTP servers will not accept outgoing mail having a source address of other ISPs. Thus, some or all SMTP traffic may be internally redirected to an SMTP server that will accept outgoing mail for the source IP address.

In one embodiment, in addition to, or in place of, the redirection and/or internal redirection techniques described above, redirection manager 292 supports other conventional means of redirection including modifying the IP address of a DNS request, or redirecting SMB traffic or NetBios traffic to allow services using such traffic to be modified.

If a device sends a DNS request, the device will send the DNS request to the domain name server configured for that device. Some destinations such as "mailserver" may not be properly resolved by any domain name server configured for that device, and instead should be sent to a domain name server that can properly resolve them. In such embodiment, privileges for port 53, the port corresponding to a DNS will cause the packet to be internally redirected to a domain name server 226 configured to properly resolve such destinations to an address that can be detected as described below.

The name server 226 will identify if an address for one of the special names used by system 200 is being requested, and if so, will provide it. For example "mailserver" may resolve to an address of the mailserver from which a user may retrieve e-mail at that location. If a user has an access controller similar to access controller 220 at home and uses a different access controller 220 at work, requesting e-mail from "mailserver" allows a user to retrieve mail from different servers depending on the user's location by configuring name server 226 at each location with the proper address of the mail server to be used. If the name is not on the list of special names, the name server 226 refers the request to a conventional name server. The name server 226 may be part of the access controller 220 in one embodiment, so that, for example, a separate name server is not needed for an access controller used at a person's home.

The use of domain name servers, redirection and internal redirection described herein allows traffic to be routed in a unified way based on privileges and conditions that can be used no matter which protocol is in use by the traffic.

In one embodiment, NAT manager 280 monitors the NAT queue and when it detects a frame record at the head of the queue, NAT manager 280 attempts to identify a translated source IP address and port number to use for translation as described in more detail below. NAT manager 280 also maintains in NAT storage 282 entries in a NAT table, which may have a structure other than a table, that preserves information in the frame record that will be changed by NAT manager 280 and also stores the translated source IP address and port number that will be used to translate responses so that they are sent back to the device 242–256 that sent the communication for which the response is received.

To identify a translated source IP address and port number, NAT manager 280 retrieves the MAC address, source IP address, source port, destination IP address and destination port from the frame record corresponding to the pointer it removed from the NAT queue and then attempts to locate an entry matching these identifiers in a NAT table stored in NAT storage 282. The table may be a hash table or a Btree or a list indexed using these identifiers or any other identifier computed using the MAC Address and Source IP Address of the Frame Record. If an entry containing the MAC Address, source and destination IP addresses and ports from the frame are not located in the table, NAT manager 280 uses the MAC address to retrieve the privileges for that MAC address and checks to see if real IP mode is "active" for the MAC address.

In one embodiment, real IP mode is active if the user has privileges allowing real IP mode, any conditions for the real IP mode privilege are met, and the source IP address of the device the user is using will allow responses to be returned to the access controller 220 through which the user is communicating. The source IP address would not allow such responses to be returned if the source IP address was not valid for the subnetwork of the network 214 on which the access controller was operating. In one embodiment, the determination of whether the conditions of the real IP mode privileges are met are determined when the user logs in, and stored in a flag that can be tested rather than testing the conditions themselves.

If real IP mode is not active, NAT manager 280 assigns a translated IP address and a port number to the MAC address/ source IP address and port/destination IP address and port combination, and stores in the NAT table the translated IP address and port number assigned along with the MAC address, source and destination IP address and port number from the frame record, the protocol from the frame record, and any changed location destination IP address and port that was swapped by redirection manager 292 as described above. In one embodiment, NAT manager timestamps the entry in the NAT table with an indicator of the current time and optionally the date.

To assign an IP address and port on the access controller 220 to a source IP address and source port number pair for use as a translated source IP address and port number, NAT manager 280 selects a port number that is not already in the table from those port numbers not assigned by IANA (0-1023) and uses an IP address assigned to the access controller 220.

In one embodiment, each access controller 220 may have more than one IP address assigned to it to provide additional translated sources. In such embodiment, these IP addresses are stored in NAT manager 280 and one of these IP addresses is also selected by NAT manager when the port is selected, from among the IP address/port pairs not already in the table in NAT storage 282.

If real IP mode is active for the user, an entry for the connection is added to the NAT table in NAT storage 282 as described above, except that no translated IP address or port number is assigned. Instead, the entry is marked to indicate "do not translate".

In the event that the MAC address, and the source and destination IP addresses and port numbers are located in the NAT table in NAT storage 282, NAT manager 280 checks the entry in the NAT table in NAT storage 282 to determine if the entry has been marked to indicate "do not translate". If so, NAT manager 280 updates the timestamp in the entry in the NAT table and adds the pointer to the frame record to the end of a network interface queue. Otherwise, NAT manager 280 retrieves the translated port number and IP address previously assigned to them and updates the timestamp.

NAT manager 280 then modifies the frame record in the NAT queue to contain the translated source IP address and port number in place of the source IP address and port number of the device 242–256. Any other technique that can allow a response to be directed to the access controller and tracked to the originating device so that the originating device can determine how to properly process the response may be used by the present invention. When the frame record has been modified as described herein, NAT manager 280 adds the pointer to the frame record to the end of the network interface queue.

In one embodiment, NAT manager 280 periodically cleans up the NAT table in NAT storage 282 by deleting entries in the NAT table that have a timestamp older than a certain amount of time. If a pointer to a TCP packet having the FIN flag set is received by NAT manager 280, NAT manager marks the entry in the NAT table as having received the FIN packet. Such entries so marked may be deleted after a smaller amount of time than entries not so marked. The small delay can allow a packet to be resent to the proper address if it is not received.

In one embodiment, some services are provided by the access controller 220 itself in place of requesting such service from the destination in the frame record and these services are referred to herein as internal services. Internal services may include servicing DHCP server requests, or processing local destination requests as described in more detail below. Internal services manager 288 monitors the internal services queue in frame record storage 290 and if a pointer to a frame record appears at the head of the queue, internal services manager 288 passes the pointer to the appropriate manager that can provide the service requested in the frame record. For example, if the frame record is marked as using the DHCP protocol, internal services manager 288 provides a pointer to the frame record to DHCP manager 284. If the frame record specifies the IP address of a web page for a local service, internal services manager 288 provides a pointer to the frame record to local services manager 297. If the frame record is an Address Resolution Protocol (ARP) request (described in more detail below), internal services manager 288 provides the pointer to the frame record to the end of a device address resolution protocol queue.

If the frame record for the pointer it receives from internal services manager 288 is a DHCPDISCOVER message or other similar message such as a DHCP request, DHCP manager 284 retrieves from, and checks the users privileges in, local privileges storage 275 (or checks the privilege in the frame record) to identify whether the user can operate in real IP mode under any condition, whether or not the condition is presently satisfied. If so, DHCP manager 284 places the pointer to the frame record onto the end of the NAT queue. This will send the DHCPDISCOVER message (or other similar message) unaltered into the network.

As described below, when a DHCPOFFER message is received in response (or other similar message such as a DHCP ACK), reverse NAT manager 281 forwards DHCPOFFER messages to DHCP manager 284, which holds the old IP address and substitutes the new IP address for the user into the entry for the MAC address for that user in local privileges storage 275. DHCP manager 284 then places the DHCPOFFER message (or DHCP ACK) at the end of the access point queue in frame record storage 290 for transmission to the requesting device. DHCP manager 284 also adds the IP address or other identifier of the access controller 220 containing DHCP manager 284 in the privileges record for the user in local privileges storage 275 to indicate that it is the access controller that was in communication with the device at the time the IP address was issued to the device. As used herein, when this condition is still true, the IP address for the device is said to have been issued "locally".

If the user cannot operate in real IP mode under any circumstance, DHCP manager 284 builds a response frame record that provides an IP address the device that sent the DHCP request should use to identify subsequent communications to access controller 220 and places the response frame record at the end of the access point queue in frame record storage 290. DHCP manager 284 sets a flag in the response frame so that access point manager 270 access point interface 260 or both can send the response from as a DHCPOFFER message using conventional DHCP response techniques, such as those described in Naugle, *Illustrated TCP/IP* (John Wiley and Sons, Inc. New York 1999 ISBN 0-471-19656-8), which is hereby incorporated by reference in its entirety.

In one embodiment, if the user cannot operate in real IP mode in any circumstances and the frame record indicates the user already has an IP address and is suggesting that address, DHCP manager 284 responds by building a frame record that renews the lease on that IP address, marking the frame record as a DHCP frame and placing the frame record at the end of an access point queue. The existence of a conflict with an IP address already in use is not of concern if a point to point connection exists between the access controller 220 and the device because the MAC address of the device can be used to route communications to a device even though one or more other devices communicating with the network 214 via the same access point 230–234 are using the same IP address. In this regard, the renewal of the lease is referred to herein as being performed "addresslessly", meaning independently of the IP address already in use or the other addresses in use.

If no such point to point connection exists, for example, because the network access point 230–234 is a hub or other similar apparatus that broadcasts communications to multiple devices, if the user cannot operate in real IP mode under any circumstances and the frame record indicates that the user has an IP address and is suggesting that address, DHCP manager 284 responds by renewing the lease on that IP address unless the IP address suggested is already in use by another device, which DHCP manager 284 detects by comparing the source IP address of the frame record corresponding to the pointer, to the IP addresses in the NAT table in NAT storage 282. If a conflict appears with a device having a different MAC address, in one embodiment, the device is issued an IP address from a pool of IP addresses DHCP manager 284 maintains as provided by a system administrator. If a conflict appears with a device having a different MAC address, in another embodiment, the device is issued an IP address selected randomly from a large address space or another selection process that can minimize conflicts.

A system administrator may configure the access controller 220 to allow or disallow renewal of the lease addresslessly by using DHCP manager 284 or another element of access controller 220 to receive and store in DHCP manager 284 an indication of whether such renewals should be performed addresslessly because point to point connections exist, for example because the access point 230–234 for which the access controller 220 controls access to the network 214 is, or contains, a conventional switch, or that they should not be performed addresslessly, because for example, the access point 230–234 for which the access controller provides access to the network 214, is or contains a conventional hub or bridge. DHCP manager checks the stored indication to determine whether to renew leases addresslessly or not as described above.

Access point manager 270 monitors the access point queue and if a frame record is on the head of the queue, access point manager 270 removes it from the queue, builds the DHCP packet and sends it to access point interface 260 for transmission back to the requesting device via input/output 262. Because response frames provided by DHCP manager 284 are marked as DHCP frames, access point manager 270 builds them according to the DHCP protocol instead of the TCP protocol.

If the frame is a DHCPREQUEST message, DHCP manager 284 will provide a DHCPACK message as a response frame record and place a pointer to the frame record at the end of the access point queue, flagged to allow proper formatting by access point manager 270 and access point interface as described above.

In one embodiment, DHCP manager 284 uses conventional DHCP relay protocols (described at RFC 2131, 951 and 1542 incorporated herein by reference in their entirety) to forward DHCP messages to and from the DHCP server.

In one embodiment, one or more set up web pages for local services is provided as an internal service. If a user attempts to request that page or those pages, internal services manager 288 passes the frame record to local services manager 297. For each such request, local services manager 297 generates a web page containing a list of what are referred to herein as local devices. A local device is a device or other destination that is defined by a system administrator via master controller 222 and transmitted to local services manager 297 as being nearby, or most nearby among the other devices on the network in the same class (e.g. printer, scanner, fax server, disk drive, etc.), to the network access point 230–234 being served by the access controller 220. This coupled with conventional address resolution techniques allows a user to type in to a browser as a URL, "printers" and see a web page provided by local services manager 297 that has a list of printers that are nearby the network access point 230–234 being served by the access controller 220. The web page contains a link to "install" the printer via conventional Internet Printing Protocol techniques. If the user clicks the link, any required printer drivers are installed and the printer identifier on the device is ready for use as if it were one of the local printers installed on the user's device 242–256.

In one embodiment, internal redirection to local services may be provided by access controller 220. One type of local service may be a nearby HP printer designated by "\\HPPrinter\", or a nearby PostScript printer designated by "\\PSPrinter\" providing access to a printer that is located nearby to the network access point 230–234 with which the user is communicating and is capable of interpreting HPGL commands, or Postscript commands, respectively. A single local service designator "\\Printer\ may be used for the default printer language, such as PostScript. Redirection to local services allows a user to specify the same local service designator no matter with which network access point he or she is communicating, and the actual local service used will be a destination that depends on the network access point or access controller with which the user is communicating as described above. One benefit to this arrangement is that many users may already have drivers for such destinations installed on their devices, allowing the use of these destinations without significant setup. Although printers are described herein, local services may include any device that is not centrally located, including fax servers, scanners, disk drives and web pages such as those of an intranet.

Local services manager 297 maintains a table of such destinations as well as the actual IP address and port number of one or more nearby destinations that can handle the type of local service specified. When a privilege record is received by privileges requester 272 as described below, it passes the privileges record to local services manager 297, which matches the destination IP address of the local service in the table with the IP addresses in the table and if a match is located, it places the actual IP address and port number of the nearby device that is assigned that local service in the table using the matching entry in the table into the destination of the internally redirected IP address and port fields of the privilege for that IP address in local privileges storage 275. When communications to the generic IP address are received by privileges manager 273, it will redirect the communications to the appropriate destination such as the nearest printer that can handle the local service requested.

In one embodiment, the device or other destination to which the frame will be redirected can handle communications for that type of local service and may be the nearest device to the access controller 220 that can handle such communications. In another embodiment, each entry in the table of local services contains information regarding translations that may be performed to use the device. Local services manager 297 performs the appropriate translation on the data of the frame record prior to placing the corresponding pointer onto the redirection queue. This allows the language of the printer communications to be adapted according to the languages supported by the local printer, for example. In another embodiment, the internal redirection is to a device such as master access controller 222 that performs such translation and ultimately internally redirects the data in the frame to the appropriate destination.

In one embodiment, a user may override settings for local services by requesting a web page having a URL similar to "options", provided by local services manager 297 as described above. The user may select a specific local printer or other destination or device that can handle communications for the type of local service specified to use in place of the nearest local printer or other destination by clicking on a link from a list of links describing names and locations of printers. For example, if the user clicks a link corresponding to the printer desired, which is sent as a request for a web page containing an identifier of the type of local service selected, and the request will be intercepted by internal services manager 288 and a pointer to the frame record routed to local services manager 297 in a manner similar to that described above. If the privileges for changing the local service or all local services are allowed for that user, local services manager 297 changes the destination to which such communications for that type of local service will be redirected to the IP address corresponding to the destination selected by the user in the privileges record for the user in local privileges storage 275.

In one embodiment, local services manager 297 or master access controller 222 acts as a proxy by responding to messages in some or all of the frames received from both devices. If local services manager 297 is acting as the proxy, it may mark the frame record and NAT manager 280 will mark the entry in the NAT table so that the reverse NAT manager 281 described below can return all responses to local services manager 297. Local services manager 297 will investigate the contents of each frame record it receives and build an appropriate response frame as necessary according to the local services selected, such as the printer language used by the device from which the frame was received, passing a pointer via network interface queue or access point queue as appropriate.

ARP/broadcast manager 283 monitors the device address resolution protocol queue and if a pointer is at the top of the queue, ARP/broadcast manager 283 builds a response frame record using the ARP protocol identifying the MAC address of the access controller as the Mac address of the gateway the device has requested.

Network interface manager 298 monitors the network interface queue, and if a frame record is detected at the head of the queue, network interface manager 298 builds a TCP packet, UDP packet or other form of communication appropriate to the protocol and sends the packet or communication to network interface 264. Network interface manager 298 passes the pointer to the delete frame queue, for deletion by delete manager 268.

Network interface 264 includes a conventional network interface which uses the packet to build a conventional Ethernet frame which it transmits to the network 214 via input/output 266. To build the frame, network interface 264 adds the MAC address of the device to which the frame should be sent for processing. The MAC address used to send the frame will be either a MAC address of a device on the network 214, which in one embodiment, is a subnetwork of a larger network, or the MAC address will be the MAC address of a gateway to the remainder of the network. Network interface 264 maintains an address resolution table that it internally stores that matches IP addresses to MAC addresses, which is built and maintained using conventional address resolution techniques, such as by monitoring address resolution protocol messages and requesting MAC addresses for IP addresses not located in the table, and optionally periodically flushing the table. If the MAC address is located in the table, network interface 264 builds the frame with the MAC address located and transmits it onto the network 214. If the address is not located in the table, network interface 264 builds an address resolution protocol request and sends it onto the network and queues and timestamps the frame. Network interface 264 monitors the address resolution protocol traffic on the network 214 and if a response is received for the address resolution protocol request, network interface 264 adds it to the address resolution protocol table.

Periodically, network interface 264 monitors the queue and if the timestamp on an entry in the queue exceeds a threshold, network interface 264 checks the IP address in the frame against the table. If the address is located in the table, network interface sends the frame to the MAC address corresponding to the IP address in the address resolution protocol table. If not, in one embodiment, network interface 264 retrieves the MAC address of a gateway from the table and uses the address of the gateway as the MAC address of the frame. In one embodiment, a system administrator provides the IP address of the gateway to network interface 264 using a browser or command line interface, and network interface internally stores the IP address. The MAC address for that IP address is identified using conventional address resolution protocol techniques and the IP address and MAC address is stored in the table. Network interface thus looks up the MAC address for the IP address of the gateway and uses that MAC address in place of the MAC address corresponding to IP addresses not in the table and for which a reply to an ARP request has not been received.

In one embodiment, access to the gateway is controlled by a "gateway" privilege. In such embodiment, if network interface 264 is to use the MAC address of the gateway, it first checks the gateway privilege to determine whether access to the gateway is allowed under the current conditions for the device that sent the frame record corresponding to the frame. In such embodiment, network interface manager 298 sends to network interface the MAC address or MAC address and IP address of the device from which the frame record was received, and network interface 264 sends the MAC address or MAC address and IP address to privileges manager 273 to use to retrieve the privileges record for the device and identify whether the gateway privilege for the device allows access to the gateway under the current conditions. If the gateway privilege does not allow the device access to the gateway or does not allow the device access to the gateway under the current conditions, network interface deletes the frame and notifies NAT manager 280 to delete the entry in the NAT table corresponding to the frame.

If a response or other communication is received by network interface 264 via input/output 266, network interface 264 receives the frame and passes it to network interface manager 298. Network interface manager 298 extracts the packet from the frame and examines the packet to determine if the packet is an address resolution protocol request or broadcast datagram.

Address resolution protocol requests are requests for a MAC address of a device using an IP address and are described in IETF RFC 826 at the Web site of ietf.org. If the packet is an address resolution protocol request, network interface manager 298 builds a frame record and places the frame record at the end of a network address resolution protocol (ARP) queue in frame storage 290 for processing as described below.

If the packet is a broadcast datagram, network interface manager 298 builds a frame record containing the contents of the broadcast datagram and places the pointer at the end of a broadcast queue in frame storage 290.

If the packet is not an address resolution protocol request or broadcast datagram, network interface manager 298 builds a frame record without the MAC address and places the frame record at the end of a reverse NAT queue in frame storage 290 for use as described herein.

ARP/broadcast manager 283 monitors the network address resolution protocol (ARP) queue, and if it detects a packet on the queue, it compares the IP address in the request with the IP addresses in local privileges storage 275. If the IP address is not located or the address corresponds to one or more users, none of which have privileges allowing real IP mode at any time, ARP/broadcast manager 283 passes the pointer to the delete queue for deletion by delete manager 268. If the IP address is located in local privileges storage 275, and the entry in local privileges storage does not indicate that the user is not in direct communication with the access controller 220 as described below (e.g. an address of an access controller other than the access controller 220 containing ARP/broadcast manager 283), and the real IP mode is active at least under certain conditions for the real IP mode privilege which may or may not apply at the time the address resolution protocol request is received, ARP/broadcast manager 283 builds a frame record containing a response to the Address Resolution Protocol request that identifies the MAC address of the access controller 220, instead of the MAC address of the device and passes a pointer to the frame to the network interface queue.

ARP/broadcast manager 283 also monitors the broadcast queue. If a pointer is detected at the end of the broadcast queue, ARP/broadcast manager 283 retrieves the pointer from the queue, scans the privileges in local privileges storage 275 and for each user that does not have an indication that the user is no longer in direct communication with the access controller and real IP mode is active with the real IP mode privilege applying at least conditionally for conditions which may or may not apply at the time the broadcast datagram is processed, ARP/broadcast manager 283 builds a frame record addressed to that user's device and otherwise containing the contents of the frame record pointed to by the head of the broadcast queue and places the pointer to the record onto the end of the access point queue and then places the pointer at the head of the broadcast queue to the end of the delete queue. This allows broadcast datagrams to be received by all such devices.

Reverse NAT manager 281 monitors the reverse NAT queue in frame record storage 290 and removes frame records at the head of that queue. Reverse NAT manager 281 retrieves the destination IP address and destination port number from the frame record and uses them to locate the MAC address, IP address and port number stored in the NAT table assigned to that port number in NAT storage 282.

If a corresponding entry is not located in the table, reverse NAT manager 281 places the pointer to the frame record at the end of the delete queue for deletion by delete manager 268.

If a corresponding entry is located in the NAT table, reverse NAT manager 281 determines whether the communication should not be translated because the entry in the NAT table is marked "do not translate". If not so marked, reverse NAT manager 281 substitutes the IP address and port number of the device 242–256 from that entry stored in the NAT table in NAT storage 282 in place of the destination IP address and port number in the frame record, and otherwise does not make this substitution. In one embodiment, reverse NAT manager 281 updates the timestamp for the entry in NAT storage 282. Reverse NAT manager 281 adds the MAC address located in the entry in the NAT table to the frame record.

If the entry in the NAT table includes the IP address and port number of an internally redirected location, reverse NAT manager 281 substitutes the original IP address and port number for the source IP address and port number in the frame record.

Reverse NAT manager 281 places the frame record at the end of the access point queue in frame record storage 290 for forwarding to the proper device via access point interface 260 and a network access point 230, 232 or 234 as described above.

Certain communications, (such as those containing certain destination port numbers or DHCPOFFER messages) are trapped by reverse NAT manager 281 and routed internally to the access controller 220, such as communications to a port reserved for log in manager 274 or DCHPOFFER messages. Reverse NAT manager 281 forwards the pointer to that internal element of access controller 220, such as log in manager 274 or DHCP manager 284, which may be performed via an appropriate queue. Another port may be reserved to provide configuration information such as the location of local printers to local services manager 297 by a system administrator. Another port may be reserved for communication with between session manager 286 and master access controller 222 described below. Still another port may be reserved for tunneling described below. More than one port may be reserved for each of these purposes.

The various services described above were performed after privileges manager 273 located the privileges record for the user in local privileges storage 275. However, if the privileges are not located in local privileges storage 275, privileges manager 273 passes the pointer to the frame record to privileges requester 272, which stores the pointer in an internal circular buffer with a timestamp indicating the date and time the pointer was stored there. Privileges requester 272 then generates a request to master access controller 222 for a privileges record for the MAC address.

To generate the request, privileges requester 272 builds a frame record with a particular source port identifier and IP address that will allow the response to be directed back to privileges requester when it is received by network interface manager 298 as described herein, and inserts a destination address and port corresponding to a privileges request port of master access controller 222. Privileges requester 272 includes in the request the MAC address and the IP address from the frame record pointed to by the pointer received from privileges manager 273. These addresses are returned in the response to allow privileges requester 272 to match the response with the MAC address to which the response corresponds. Privileges requester 272 places the pointer to the frame record it builds to the end of the network interface queue for transmission as a frame to the master access controller 222 as described herein.

Upon receipt of the frame, master access controller 222 checks an internally stored master list of all MAC addresses logged into the system 200. The master list may be arranged as a B-Tree indexed by MAC address. If a privileges record for the MAC address is in the list, in one embodiment, master access controller 222 returns the privileges for the user as one or more frames, addressed to the privileges requester 272 that sent the request.

If a user is logged onto the system, it is because the user has been in recent communication with another access controller. In one embodiment, instead of providing the privileges record, master access controller provides the IP address or other identifier of the access controller that last requested a privileges record for the MAC address from the master access controller 222 or otherwise indicated that such a privileges was received, referred to as the former access controller. In such embodiment, when privileges requester 272 receives the IP address, it builds a frame record containing a request for the privileges record for the user that has a destination IP address of the former access controller received from master access controller 222 with a destination port that identifies the privileges requester, and a source IP address of the access controller containing the requesting privileges requester and source port identifying the privileges requester 272 and places a pointer to the frame record onto the end of the network interface queue. As described in more detail below, each access controller has a reverse NAT manager 281 that receives packets from the network interface, and such reverse NAT manager 281 in the former access controller will provide a pointer to the frame record to the privileges requester 272 in the former access controller by placing it onto the end of the privileges queue. The privileges requester 272 in the former access controller will build a response frame containing one or more frame records and provide the privileges record to the new access controller by placing pointers of the response frames onto the end of the network access queue.

In either embodiment, one or more frames containing the privileges for the record are received by reverse NAT manager 281 in the new access controller, and provided to privileges requester 272 via the privileges queue. Privileges requester 272 stores the privileges for the MAC address in local privileges storage 275 as described herein. In the embodiment in which the privileges are received by the other access controller, privileges requester 272 in either access controller may inform master access controller 222 that the privileges record has been received, and master access controller 222 or privileges requester 272 in the new access controller may inform the privileges requester 272 in the former access controller to delete the privileges record from local privileges storage 275 in the former access controller with a message containing the MAC address or MAC and IP address of the privileges record to be deleted. Privileges requester 272 signals privileges manager 273 with such address or addresses, and privileges manager 273 deletes the privileges record from local privileges storage 275.

In one embodiment, each time privileges manager 273 determines the privileges for a frame, it timestamps the privileges record. Periodically, privileges manager 273 checks the timestamps with the current date and time from a system clock (not shown) for the privileges records held in local privileges storage. If the difference between the timestamp of a privileges record and a system clock exceeds a threshold, privileges manager 273 signals privileges requester 272 with the MAC address or MAC and IP address of the privileges record it deletes. Privileges requester 272 builds a frame record containing the IP address of the master access controller 222 to inform the master access controller 222 that the user is no longer logged in to he access controller. Master access controller 222 removes the MAC address and optionally the IP address from its list of logged in users and sends an acknowledgement containing the MAC address or MAC and IP addresses to privileges requester 272 via reverse NAT manager 281 as described above. Privileges requestor 272 signals privileges manager 273 to delete the privileges record from local privileges storage 275 by providing the MAC address or MAC address and IP address of the user.

If the privileges record is received by privileges requester 272, it places the pointer to the frame record back into the privileges queue, but stores a copy of the frame record in a circular buffer in holding area 271 to allow the original frame to be processed if the user is required to log in as described below. However, if the privileges record is not received by privileges requester 272 before the expiration of the timestamp or not received at all, privileges requester 272 passes the pointer to delete manager 268, which deletes the frame record from frame storage 290 and returns the pointer.

Privileges requester 272 scans the circular buffer in which it stored the pointer as described above and if the privileges record has a MAC address and IP address that matches one of the pointers stored in the buffer and for which the timestamp has not expired (which in one embodiment, is any timestamp that is less than or equal to 5 seconds from the current date and time), stores the privileges record for the user into local privileges storage 275 indexed by a user identifier that is based on the MAC address of the device.

When the pointer arrives at the top of the privileges queue, privileges manager 273 will locate the privileges for the user in local privileges storage and process the frame record as described above.

If the MAC address is not found on the master list in master access controller 222 when privileges requester 272 requests it, master access controller 222 returns a "not logged in" privileges record for the user.

The user may then be required to log in. There are many ways that may be used to allow a user to log in and provide log in information such as a user identifier and password. Any or all of the ways may be available in access controller 220 and may be selectable by a system administrator using indications in the not logged in privileges record.

In one embodiment, a not logged in privileges record is defined to have an action of "redirect" to a destination of an unsecure web page at the IP address of the master access controller 222 for all targets having a destination port corresponding to the HTTP protocol, and an "internally redirect" to a destination of a secure web page at the IP address of the master access controller 222 for all targets having a destination port corresponding to the HTTPS protocol (The user may be warned by his or her browser that the site name does not match the site requested and may be allowed to confirm that such redirection is proper. If the user does not provide such confirmation, the redirection may not occur. To continue, the user may be required to attempt to connect to another destination that does not use the HTTPS protocol or provide the confirmation).

Because in this embodiment, the action for all HTTP or HTTPS requests for the not logged in user is a redirect or internal redirect, privileges manager 273 will add to the frame record the IP address or URL of the destination to which the user should be redirected according to the privileges in local privileges storage 275 and place the pointer onto a redirection queue if the original request had an HTTP or HTTPS destination port number. Redirection manager 292 scans the queue and adjusts the destination IP address as described herein.

If the location is adjusted to the unsecure web page, master access controller 222 will respond with an HTTP redirection response, such as a "location" header, redirecting the user to the secure web page.

When the user requests the authentication page, either due to the redirect or via the internal redirection, master access controller 222 provides a secure web page with form elements such as a text box and a password box for providing one or more identifiers such as a username (which can be any identifier, such as a secureID, credit card number, social security number or any other identifier that can uniquely distinguish the user from other users who may log onto the system) and password, credit card number, birthdate or other information that may be used for authentication purposes and to determine the privileges the user should receive. When the user presses a submit button on the page, master access controller 222 receives the contents of these form elements via conventional CGI techniques.

It isn't necessary that the master access controller 222 handle the log on as described herein. Another server that performs the authentication operations described herein may be used to allow a user to log on.

The request for the secure web page will have a source IP address and port number that uniquely identifies the device 242–256 that sent the request to the access controller that network address translated it as described above. Master access controller 222 uses the source IP address and port in the request for the secure web page to send a request to the access controller, but instead of sending the request to the source port number specified in the request, it sends the request to a reserved port number for such requests and includes as a parameter in the request it sends the source port number from the request for the secure web page. As described herein, reverse NAT manager 281 will receive a pointer to a frame record corresponding to the request and identify that the communication is intended for log in manager 274 using the destination port in the frame record. Reverse NAT manager 281 will place the pointer to the frame record on the end of a log in queue.

Log in manager 274 monitors the log in queue and if a pointer to a frame record is detected at the end of the queue, uses the port number parameter of the request and the IP address in the frame record to identify the MAC address that has been assigned that port number and the IP address in NAT storage 282. Log in manager 274 builds a response frame record containing in the UDP data contents of the frame record the port number parameter, the MAC address and IP address of the device located from NAT storage 282 (and optionally the original contents of the request frame) and places a pointer to the frame record onto the end of the network interface queue. Network interface manager 298 will build a frame from the frame record and provide it to network interface 264 for transmission to master access controller 222 via input/output 266. Master access controller 222 receives the frame from access controller 220.

Master access controller 222 provides the identifiers from the form elements (or from the frame if a request frame was sent from access controller 220 after it had intercepted the user identifier and password as described above) and the source IP address and source port number from the request for the secure web page to authentication server 224, which may be any conventional server such as an LDAP, RADIUS, NT, Unix or Oracle server.

In one embodiment, master access controller 222 provides the MAC address to authentication server 224, which authentication server may use as part of the authentication process, for example, by only allowing a user to log in via a device with that MAC address. In such embodiment, master access controller 222 includes the MAC address it receives as described above. In another embodiment, the MAC address is not used as part of the authentication process and so it is not provided by master access controller 222 to authentication server 224. In such embodiment, the request for the privileges record and the request for the MAC address may be processed simultaneously.

Master access controller 222 receives a privileges record from authentication server 224 (or in the embodiment, in which privileges record are stored by master access controller 222, master access controller 222 locates such privileges record in its own internal disk or memory storage when authentication server 224 informs master access controller 222 that the user has been authenticated). The privileges record may contain the IP address and port number provided in the request for the privileges record, and master access controller 222 uses this information and the IP address from the response frame header, and the port number and MAC address located in the data portion of the response frame, it receives from access controller 220 to match the MAC address to the privileges record.

Master access controller 222 stores the MAC address and the IP address of the access controller 220 with the privileges record in the list of logged in users as described above. If the log in was performed via the authentication web page embodiment, master access controller 222 then sends an HTTP location command to the device in response to the submit button being pressed, redirecting the device to the original destination requested by the device before the device was redirected to the secure web page. The device will provide a request to that location to access controller 220.

When the privileges record is rerequested by privileges requester 272, this time, master access controller 222 has it stored in the list of users logged on and so master access controller 222 provides it when requested as described above. Privileges requester stores the privileges record in the B-Tree described above in local privileges storage 275 indexed by the MAC address of the frame record, along with the source IP address of the frame record, to record the IP address in use by the user. Alternatively, master access controller 222 can provide it as if it had been requested as described above when master access controller 222 locates it in its internal storage or receives it from authentication server 224 so that it is stored in local privileges storage 275 when the privileges of the user are investigated by privileges manager 273 as described above.

If the user is required to log in for purposes other than authentication to access controller 220 (e.g. because the user is required to log into an NT domain) via a location on the network (referred to as the "log on location") the user may be allowed to reach the log on location before the user is logged in to the access controller. In such embodiment, the log on location may be allowed as part of the not logged in privileges record and the user allowed to manually access it. When the user attempts to communicate with the log on location, access controller 220 intercepts the user's responses to the prompts provided by the log on location prior to forwarding them to the log on location and stores the user's user identifier and domain. In addition, access controller 220 also intercepts the responses from the log on location. If the response from the log on location contains certain attributes of, or matches exactly, the response the log on location would be expected to provide if the log on location authenticates the user, the user is logged into the system without any further prompting by access controller 220 for a user identifier or password.

The user identifier may be used to log the user into master access controller 222 and receive a privileges record for that user by sending a request containing the MAC address for the user, the user identifier and domain or other log in information, with a source port and IP address that identifies the privileges requester 272 of the access controller 220 as will now be described in more detail.

When a frame record is received for the log on location, the not logged in privileges record will identify the destination IP address as having an action of "monitor log on location". Privileges manager 273 will place the frame pointer onto the end of a privileges queue in frame storage 290. Privileges manager 273 scans the packet header or the packet contents of the frame record to determine if it contains a response to a form provided by the log on location. If so, privileges manager 273 extracts the user identifier, domain identifier and optionally, other information provided in the response to the form. Whether or not the packet contains such a response, privileges manager 273 identifies whether an entry for the MAC address of the frame record is contained in an internally-stored privileges NAT table it maintains. If not, privileges manager 273 assigns an address and port number combination to the user that can identify the user and adds the MAC address and the assigned address and/or port number as a new entry into the internally-stored privileges NAT table. For example, the address may be the address of the access controller 220 and the port may be one of a number of ports reserved for privileges manager's use and not already in privileges manager's 273 internally stored NAT table. Privileges manager 273 replaces the source IP address and port in the frame record with the address and port number it assigned and places the frame record onto the end of the network interface queue for transmission to the log on location. In one embodiment, if all of the reserved address/port combinations are in use, privileges manager 273 timestamps and queues the frame record until a combination is freed or a time period elapses, at which point privileges manager 273 builds a response frame instructing the user to try again later and places a pointer to the response frame onto the end of the access point queue. If the packet contents of the frame record contains the user's user identifier and other information such as a domain, privileges manager 273 extracts that information and stores it in the privileges NAT table internally stored in privileges manager 273.

The address and/or port number assigned identifies to reverse NAT manager 281 that responses from the log on location are to be forwarded to privileges manager 281 and so frame records received from the log on location having a destination with the address and port number assigned will be placed by reverse NAT manager 281 onto the end of the privileges queue. Privileges manager 273 monitors the privileges queue and if the destination IP address and port matches one of those in the internally stored table, privileges manager 281 reads the packet contents of the frame record to determine if the packet contents of the frame received from the log on location contains a form requesting the user's user identifier, domain and/or other information, a notification that the user's log on information has been authenticated, or a notification that the user's log on information has not been authenticated. Privileges manager 281 scans the packet contents of the frame record to match patterns of characters expected for each of these three possibilities, or for two of the three possibilities with the remaining one being assumed if no match occurs.

If the packet contents of the frame record contains an indication that user's log on information is authenticated, privileges manager 273 passes the passes in a frame it builds the user identifier and optionally the domain or other log in information such as credit card number and the MAC address from the internally stored NAT table to master access controller 222 by placing a pointer to the frame record onto the end of the NAT queue (the source port of the frame record identifies privileges manager 273 so that responses may be returned to it). Upon receipt of an acknowledgment from master access controller 222, privileges manager 273 then deletes the entry corresponding to that frame record from its internally stored NAT table. Master access controller 222 maintains information about the user in a manner similar to that described herein without requiring further authentication of the user, and returns a privileges record for the user as described herein. In one embodiment, the privileges record is provided according to the domain received by master access controller 222, up to the highest level domain to which that user identifier is authorized.

If the packet contents of the frame record received from the log on location does not contain an indication that the user has been authenticated, privileges manager 273 replaces in the frame record the destination IP address and port with the destination and port in the NAT table corresponding to the IP address and port of the device the user used to request the packet corresponding to the frame record that is stored in the NAT table in privileges manager 273 and places the frame record on the end of the access point queue. Privileges manager 273 then deletes the entry corresponding to that frame record from its internally stored NAT table.

Alternatively, a proxy server (not shown) may perform the man-in-the-middle function of intercepting user name and optionally the domain and/or other information and passing it to privileges manager 273 via the techniques described herein, and in this case, the not logged in privileges record redirects the user to the proxy server in a manner similar to the redirection described below.

In still another embodiment, when privileges requester 272 receives the not logged in privileges record, it can request and receive log in information from another device that may have already received it or a device that can prompt the user for the log in information, such as the device 242–256 used by the user to communicate with the network or the network access point 230–234 (each of FIG. 2A) to which the access controller 220 is connected, via web browser interfaces, or 802.1X, NIS, or Microsoft Windows NT Domain Logon services, or other similar services. Privileges requester 272 then passes the user identifier and password and MAC address to master access controller 222 for authentication purposes as described below and places the pointer to the frame record originally received from the user back into the privileges queue as described above. Privileges requester 272 may place the pointer after a delay to allow master access controller 222 to authenticate the user, maintain the information about the user and return the privileges record as described below.

In one embodiment, master access controller 222 or authentication server 224 uses the authentication information, MAC address or both to enforce a requirement that only one party is logged in under a given authentication information or MAC address unless the privileges record is marked as reusable as described below. In one embodiment, master access controller 222 or authentication server 224 can enforce other limits on numbers of users, such as the number of users logged in at a given time or the number of users with certain privileges logged in at a given time. If a user attempts to exceed the number by logging in, master access controller 222 or authentication server 224 can deny access to that user, unless the privileges record for the user allows that user to override such limits.

In one embodiment, log in manager 274 restricts the number of users logged into the access controller at a certain time, or the number of users having a certain type of privileges in the privileges record logged into the access controller at a certain time. After receiving the privileges record, log in manager 274 counts the number of users logged in as indicated by privileges storage 275 (excluding those users who are indicated as not presently in direct communication with the access controller). If logging in the user causes the number of users or number of users to exceed a threshold (or a set of time-based thresholds) stored in authentication storage by a system administrator, log in manager 274 denies the user's log in request as if the user's log in request was unsuccessful as described below, and may build and provide a frame record that contains a web page explaining the circumstance to the user and place a pointer to the frame record on the end of the access point queue. In one embodiment, certain privileges, such as those given to MIS people, override any such threshold and persons with such privileges are never denied access based on the number of users of an access point.

If the user's log in attempt fails due to an incorrect authentication as described above, master access controller 222 logs the MAC address in a list of failed attempts. In the event that failures from that MAC address exceed a threshold number of failures, master access controller 222 will not allow even valid log ins from that MAC address unless the number of failures from that MAC address is reset, for example, by a system administrator who connects to an administration web page provided by master access controller 222 using a browser or using a command line interface.

In one embodiment, privileges are configurable based on certain conditions, such as the time of day retrieved from a system clock (not shown), a day of the week or month or year, a date or group of dates, a location of the access controller on which the user logs in, a number of users logged into the access controller in communication with the user logging in, a number of users logged into all access controllers communicating with master access controller 222 or any other set of conditions.

In such embodiment, master access controller 222 may determine the privileges in effect at the time the user first logged in and provide a different privileges record based on those conditions, or may provide as part of the privileges record the various conditions and the different privileges corresponding thereto, to allow the access controller to determine the privileges to provide each time a frame is received from a user. Master access controller 222 may set one or more flags indicating that certain conditions were fulfilled at the time the user logged in, and provide such flag or flags as part of the privileges record. A combination of these may also be used. For example, master access controller 222 may select certain privileges based on the number of users logged onto all access controllers which it serves when the user first logs in, but then provide a means of calculating other privileges based on time of day. As the time of day changes, the access controller will provide the corresponding level of other privileges, but keep constant the certain privileges that are based on the number of users when the user logged in, even as the number changes. In another embodiment, as the user moves from one access point to another described in more detail herein, master access controller 222 recalculates the privileges it calculates and provides the updated privileges record to the new access controller. In still another embodiment, each time a change occurs for a privilege (e.g. the time of day reaches 6 pm and many users will be receiving different privileges), master access controller 222 sends a new set of privileges for the user to whatever access controller with which the user is currently in communication.

In one embodiment, a privileges record may be indicated as reusable in authentication server 224 or master access controller 222. This allows more than one user to log on under that username and password at a time. The indication is provided by authentication server 224 to, or otherwise identified by, master access controller 222, which stores the indication with the record but does not provide it to access controllers 220 with the privileges record. This allows multiple users to log in under a guest username and password to have limited privileges such as accessing the Internet and nearby printers and/or other destinations as described herein. In one embodiment, a "guest" button is provided on the secure log in page provided by master access controller 222 to allow for easier log ins as a guest.

In one embodiment, a user may connect to a "logoff" page or a "change user" page, which is provided by master access controller 222. If the user connects to the logoff page a submit button is provided on the page. If the user presses the submit button, master access controller 222 communicates with log in manager 274 as described above to return a logoff message to log in manager 274 and requests the MAC address for the user using the port number for log in manager 274 as described above. Log in manager 274 uses the source IP address and port number to identify the MAC address from the NAT table in NAT storage 282 as described above and sends the MAC address and source IP address of the device 242–256 to master access controller 222 as described above. Master access controller 222 removes the privilege record for that MAC address from the privilege records it maintains. Log in manager 274 removes the privileges record for that MAC address and source IP address of the device 242–256 from local privileges storage 275.

The change user page may be a combination of the secure log in web page and the log off page, allowing a user to log off but provide the username and password for the user should be associated with the MAC address and IP address of the device, and then operates as described above with respect to the secure log in page, although it need not rerequest the MAC address and IP address of the device 242–256.

In one embodiment, a user may be forced off in the event that the user has not communicated with the system for a configurable amount of time. In such embodiment, log in manager 274 periodically scans the timestamps in NAT storage 282 for each user not marked as not communicating directly with the access controller as described herein. If the all of the timestamps exceed a threshold such as 20 minutes, the user is logged off, or an attempt is made to communicate with the user or the device corresponding to the user and then the user is logged off as described below. It isn't necessary to use NAT storage, as privileges manager 273 may timestamp the privileges record for the user each time a privileges manager 273 checks the privileges for a user and this timestamp may be the one scanned by log in manager 274.

In one embodiment, if all of the timestamps exceed the threshold, log in manager 274 makes one or more attempts to communicate with the device with which the user is communicating. In one embodiment, each attempt is a unicast ARP request, although other embodiments may use other forms of attempts of communicating with the device. Log in manager builds a frame record containing the attempt in frame storage 290 and passes a pointer to that frame onto the end of the access point queue in frame storage 290. A frame corresponding to the frame record will be provided to the network access point 232 with which the access controller is communicating and the network access point will forward the frame to the device 252, 254 or 256 from which a response to the attempt is desired.

A configurable number of such attempts is performed periodically, according to a configurable period. If the device responds to any of the attempts, for example, by providing an ARP response if the attempt is an ARP request or probe, local services manager 297 will pass a pointer to the response to log in manager 274. Log in manager 274 retrieves the current date and time and uses the date and time and MAC address in the response to timestamp the privileges record corresponding to the device being used by the user with the last time such a response was received. Log in manager 274 includes this timestamp as one of the timestamps it checks to determine that the user has not communicated with the system for the configurable amount of time when it performs the next check.

If no reply to the attempt is received within the period of time used to send the attempts, log in manager 274 retrieves the date and time from the system clock and marks the privileges record for the user as the time it stopped attempting to contact the user. Periodically, log in manager 274 checks such timestamps in the privileges records in local privileges storage 275 and compares them with entries in the NAT table in NAT storage 282. If an entry for a device in the NAT table contains a timestamp that is later than the date and time log in manager 274 stopped attempting to contact the user, log in manager 274 removes the date and time it stopped attempting to contact the user. In one embodiment, instead of performing this check, privileges manager 273 removes the date and time whenever it checks the privileges for the device as described above.

Periodically, log in manager 274 checks the date and times log in manager stopped attempting to contact the user and compares it with the current date and time it retrieves. If the difference between the current date and time and the date and time log in manager 274 stopped attempting to contact the user exceeds a configurable threshold, log in manager 274 logs the user off.

To log a user off, log in manager 274 signals master access controller with the MAC address of the user being logged off. Master access controller 222 removes the privilege record for that MAC address from the privilege records it maintains. Log in manager 274 removes the privileges record for that MAC address and source IP address of the device 242–256 from local privileges storage 275.

As described above, when a user attempts to communicate via the network, access controller 220 attempts to locate privileges either locally or in master access controller 222 or requests the user to log in. In another embodiment, this process begins following the establishment of communication with a network access point 230–234. In such embodiment, when a network access point 230–234 and a device 242–256 establish communications, the network access point 230–234 signals privileges manager 273 with the MAC address of the device 242–256 and privileges manager 273 initiates the privileges process described herein as if a frame record having that MAC address was on the privileges queue. The entire privileges process described above may be performed or the process up to, but not including the redirection or internal redirection to the secure web page or other authentication server for log in may be performed, with redirection or internal redirection occurring only when a frame record is received in the privileges queue from the device 242–256.

If a device 242–256 moves from one network access point 232 to another network access point 234, several issues are presented with regard to sessions, such as Telnet, Virtual Private Networking (VPN) sessions or IPSec sessions. First, it is desirable to allow the user to continue the same session as the user moves among access points. As described below, because sessions for users for which real IP mode is not active are set up between the access controller 220 and the session server, transferring the session to the new access controller 220 may interfere with certain software (because subsequent communications to the session server would arrive from the new access controller 220), and so, as described in more detail below, the session will be maintained by the original access controller 220 that set up the session, and all communications for that session routed through that access controller. Although sessions for devices for which real IP mode is active are set up between the device and the session server, because of routing issues, communications for sessions are routed to the access controller with which the device was in communication when the device was issued the IP address as described above to ensure that sessions can operate in real IP mode without routing conflicts that would interfere with the ability to communicate with the session server in real IP mode.

Second, it is possible that that data for the one or more sessions is being returned to the network access point 232 with which the user just stopped communicating. In such embodiment, the returned session information will be received by that network access point 232, but that network access point 232 will be unable to provide it to the device 242–256. As described below, in one embodiment, the system and method of the present invention may forward such communication to the network access point 234 with which the user has established communication so that the session may continue uninterrupted.

In one embodiment, when NAT manager 280 adds an entry into NAT storage 280 as described above, NAT manager 280 checks the destination port number to determine whether the port number corresponds to a session. If so, NAT manager 280 adds to the entry, information for an "anchor" column of the NAT table identifying itself as the originator of the session for use as described below. (In another embodiment, NAT manager 280 always adds the IP address of the access controller as the anchor, even for non-session communications). This information may be an IP address of the access controller 220, for example. In this embodiment, all communications for any session initiated on access controller 220 will be routed through this access controller 220 even if the user moves to a different access controller 220 on the system 200.

When the user moves to a different access controller 220, the new access controller 220 will obtain privileges for the user from master access controller 222 or the former access controller as described above. When the privileges are requested, the new access controller 220 will send its IP address to master access controller 222. Master access controller 222 maintains in the list of all users logged into system 200 the IP address of the last access controller 220 to which it sent privileges for the user. Master access controller 222 or the former access controller includes with the privileges record for the user the IP address of the former access controller which received the privileges record for that user, if any, when it sends the privileges record to the new access controller 220, and then master access controller 222 updates the privileges record to contain the IP address of the new access controller 220.

If privileges requester 272 receives the IP address of the former access controller 220, it forwards it to the end of a queue in session manager 286.

Session manager 286 in the new access controller 220 sends a request to the session manager 286 in the former access controller 220 to forward all entries in NAT storage 282 of the former access controller 220 corresponding to sessions for the user, and includes the MAC address of the user. (In one embodiment, this request is implicit in the request for privileges and the privileges requester 272 in the former access controller sends the request to session manager 286 in the former access controller). Session manager 286 in the former access controller 220 locates the entries in the NAT table in NAT storage 282 for that MAC address that have an entry in the anchor field (or if all entries have an entry in the anchor field, session manager 286 locates those entries in NAT storage corresponding to sessions as described above) and sends all such entries in the NAT table in a response to the session manager 286 in the new access controller 220. Session manager 286 in the former access controller 220 then deletes from the NAT table in NAT storage 282 for the former access controller 220 all entries for that MAC address, including entries having nothing in the anchor field, except those entries with an anchor field matching the IP address of that former access controller 220 itself (or if all such entries have an entry in the anchor field, deletes those for that MAC address not corresponding to a session for entries with the IP address of the access controller in the anchor field and deletes all other entries for that MAC address). Session manager 286 in the former access controller 220 then modifies the IP address for the user in local privileges storage 275 to be the IP address of the new access controller 220 which, in addition to identifying the new access controller, serves as an indicator that identifies the user as not presently in direct communication with the former access controller, although other indicators may be used in addition.

The communications between access controllers are performed by session manager 286 in the sending access controller building a frame record in frame storage 290 containing the request and placing a pointer to it onto the end of the network interface queue. The frame record has the IP address of the receiving access controller 220 and a port number identifying the frame as intended for the session manager 286 of that access controller 220. Network interface manager 298 at the receiving access controller 298 receives the frame and builds a frame record, but instead of sending the pointer to it to the reverse NAT queue as described herein, network interface manager 298 sends it to the session queue for receipt by session manager 286.

Session manager 286 of the new access controller 220 receives the entries from the NAT table in the frame record, identifies the IP addresses of access controllers in the anchor column, and then stores the entries of the NAT table received from session manager 286 of the former access controller 220 into its own NAT table in NAT storage 282 of the new access controller 220. For each identified IP address different from that of the new access controller 220 or the former access controller 220, session manager 286 in the new access controller sends a notification including the MAC address of the device 242–246 or 252–256 to the session manager 286 in any such access controllers 220. Those session managers 286 update the IP address for the user in their respective local privileges storage 275 to be the IP address of the new access controller 220.

When reverse NAT manager 281 receives frames from systems with which a device 242–246 or 252–256 is communicating via a session, reverse NAT manager 281 finds the corresponding entry in the NAT table in NAT storage 282 as described above. Before it translates the address as described above, it checks the anchor field in the entry corresponding to the communication. If there is no address in the anchor field or the address in the anchor field is the address of the access controller 220 containing reverse NAT manager 281, reverse NAT manager 281 performs the techniques described above.

If an address exists in the anchor field but is not the address of the access controller 220 containing reverse NAT manager 281, reverse NAT manager 281 uses the MAC address from the entry in the NAT table in NAT storage 282 to look up the IP address for that MAC address in local privileges storage 275. If the IP address in the NAT table does not match the IP address in local privileges storage 275, reverse NAT manager 281 places the pointer to the frame record onto the end of a reverse tunnel queue monitored by session manager 286.

Session manager 286 detects the pointer to the frame record and sets up a tunnel with the session manager 286 in the access controller 220 having the IP address looked up in local privileges storage 275 (the IP address may be a field of the frame record that is inserted by reverse NAT manager 281) and forwards the original frame via the tunnel, addressed to a session manager port using an IP address of the receiving access controller 220 and marking the communication as intended for the reverse NAT queue. The receiving session manager 286 receives the tunneled packet and passes the tunneled frame to network interface manager to build a frame and pass a pointer to the frame record onto the end of the reverse NAT queue, for processing as described above. In this manner, session communications received for devices no longer in direct communication with the access controller 220 (e.g. via ports on the access controller 220 directly connected to the network access point 230–234 with which the device 242–246 or 252–256 is in communication) are forwarded to an access controller 220 with which the device 242–246 or 252–256 is in direct communication.

When a pointer to a frame record is received by NAT manager 280 as described above, if it locates an entry in the NAT table in NAT storage 282 corresponding to the frame record as described above, it checks the anchor field of the entry. If the anchor field for the entry is empty or contains the IP address of the access controller 220 containing NAT manager 280, NAT manager operates as described above. If the anchor field in the entry is not empty and contains an IP address different from the IP address of the access controller 220 containing NAT manager 280, NAT manager 280 adds to the frame record the IP address in the anchor field and the MAC address from the entry in the NAT table and places the pointer to the frame record onto the end of a forward tunnel queue monitored by session manager 286. Session manager 286 sets up a tunnel with the session manager 286 in the access controller 220 having the IP address in the anchor field and forwards the packet from the frame record via the tunnel, marking the communication as one intended for the access point queue. The receiving session manager 286 extracts the frame from the contents of the tunnel communication, stores the frame in frame storage 290 and places a pointer to the frame record onto the end of the NAT queue for processing as described above.

When a user moves from one network access point 232 to a different network access point 234 if the new access point 234 is served by a different access controller 220, the former access controller may have received session data and may have even attempted to provide it without realizing that communications with the device 242–256 have been terminated. In such case, session data may be lost. In one embodiment, session data is stored until the device 242–256 for which the session data was intended sends any form of communication. The stored session data may be forwarded to the new access controller by the former access controller when it forwards the entries from the NAT table.

In one embodiment, when reverse NAT manager 281 investigates the frame record, if the frame record has a source port corresponding to a connection such as Telnet or a streaming connection, and the original source IP address in the NAT table matches IP address for the entry in local privileges storage 275 for the user having the MAC address corresponding to the MAC address of the entry in the NAT table, reverse NAT manager 281 sends a copy of the frame record after it alters it as described above to session manager 286, which stores the frame record into a set of stored frame records in session storage 287 and timestamps the frame record with the current date and time.

To manage the session frames stored in session storage 287, if the device that receives the session frame acknowledges receipt of the frame, the session frame stored in session storage 287 is deleted. When NAT manager 280 receives the pointer to the frame record from the device as described above, NAT manager 286 signals session manager 286, which deletes (or marks as available the space they occupy in session storage 287) copies of frame records in session storage 287 from that device, provided the frame record received has the ACK bit set and the sequence number of the stored frame corresponds to the count in the acknowledgment after subtracting the size of the acknowledgment.

In one embodiment, some traffic received by access controller 220 may not be acknowledged, such as UDP packets. In such embodiment, any or all of several criteria for deleting such frame records from session storage 287 may be used, such as deletion upon any communication from the device, or deletion of such frame records stored for a device in excess of a threshold. In the case of deletion in excess of a threshold, when session manager 286 receives from another access controller via a tunnel any frames having the MAC address of the device, it sends to that access controller over the tunnel all of the frames records in session storage 287 that have been stored for the device. Such embodiment may thus provide frames that have already been received by the device, but such frames will be discarded by the device itself upon inspection of the sequence number of the frames.

In one embodiment, access controller 220 is in administrative communication with network access point 230–234 and may be physically housed with the network access point 230–234. In such embodiment, if the device moves out of range of network access point 230–234 or communications between them are otherwise interrupted, access controller 220 receives an indication of loss of radio contact with the device, which is forwarded to session manager 286. In such embodiment, session manager 286 deletes stored session frames for a device for which an indication of a loss of radio contact is not received immediately, or within a certain amount of time, after sending the frames corresponding to the stored session frames, because such frames are likely to have been received by the device.

The criteria for deleting stored session frames described herein are referred to as the stored frame deletion criteria.

When the entries from the NAT table are requested by session manager 286 as described above, the session manager 286 in the former access controller 222 also provides the stored session frames for the device from its session storage 287, and deletes those frames from its session storage 287. The session manager 286 in the new access controller 220 stores the frames into frame storage 290, pointers to which the session manager 286 in the new access controller 220 places onto the end of the network interface queue for processing as described herein.

In one embodiment, the data payload of each frame record having a destination port corresponding to a session service such as TCP or UDP is investigated by session manager 286 when it is received from reverse NAT manager 281 in one embodiment or from NAT manager 280 or reverse NAT manager 281 in another embodiment. If the data payload corresponds to a close session command, and an acknowledgment frame record is received by the recipient of the frame record having the close session command, session manager 286 deletes the frames stored in session storage 287 corresponding to that session.

In one embodiment, a request to renew a lease on an IP address is treated as corresponding to a session as described herein, to be tunneled back to the first access controller, if any, at which a request to renew the lease was received while the device was logged in. Otherwise, DHCP manager 284 processes it as described herein, and the anchor identifying the access controller 220 is added to allow further requests to renew the IP address from that device to be returned to the access controller 220.

In another embodiment, when DHCP manager 284 receives a request to renew a lease on an IP address, it checks the privileges record in local privileges storage 275 to identify whether the device has privileges for operating in real IP mode and if the conditions for such privileges are satisfied. If so, DHCP manager 284 also determines whether the device has moved from one access controller to another since receiving an IP address from another access controller while in real IP mode. In such embodiment, this is performed by checking the privileges record corresponding to the MAC address of the device, in local privileges storage 275 of the new access controller 220. Each privileges record has the IP address of the most recent access controller, if any, that was in communication with the device when the IP address was initially issued to the device (referred to as the DHCP access controller). If such an IP address exists in the privileges record in local privileges storage 275, DHCP manager 284 will set up a tunnel with the DHCP manager in the DHCP access controller and forward the request to the DHCP access controller over the tunnel to allow the DHCP manager in the DCHP access controller to renew the lease, and send a response via the tunnel, which DHCP manager 284 provides as a response frame to the device, and if not, it will provide it as described herein. When a user moves from one access controller to the next, the IP address of the access controller that issued the device its IP address will be part of the privileges record in local privileges storage 275 of the new access controller.

In the event that the user attempts to establish a session such as a Telnet, VPN or IPSec session, NAT manager 280 will determine if an entry for the session exists in the NAT table in NAT storage 282. If such an entry exists, NAT manager will operate as described herein. If such an entry does not exist, NAT manager detects the session as described herein, for example, using the destination port of the frame record. NAT manager 280 checks the privileges record to determine if real IP mode is active for the device and if so, if the privileges record corresponding to the device contains an IP address of any access controller that issued the device an IP address. If such an address exists in the privileges record, NAT manager add an entry into the NAT table in NAT storage 282 as described above and need not assign an IP address and port, but assigns to the anchor field of the entry in the NAT table the IP address of the access controller that issued the device from which the frame record was received, and then processes the frame record as described herein, placing the pointer to the frame record onto the end of the forward tunnel queue, as if the session had been initiated on the access controller that was in communication with the device when the IP address was initially issued to the device as described above. Session manager 286 will receive the pointer to the frame record, set up a tunnel with the session manager of the other access controller, forward the frame record over the tunnel and send the pointer to the frame record to delete manager 268 for deletion of the frame record. The session manager at the other access controller will receive the frame record and place the frame record into frame storage and place a pointer to the frame record onto the end of the NAT queue in that access controller. The NAT manager 280 in other access controller will not locate an entry for the session, and add one as described above. It too will detect the frame record as corresponding to a session as described herein and will add an entry listing itself as the anchor. From that point on, processing will continue as described herein, with communications being sent between the intended destination and the device that sent the frame record always via the access controller that provided the IP address of the device, and also via the access controller 220 with which the device is communicating as described herein.

In one embodiment, master access controller 222 provides information about the users activities within system 200. For example, each time a user logs in or moves from one access controller 220 to another 220, master access controller 222 provides to biller/logger 206 a record of the user identifier, IP address of the master access controller 220 and date and time. Biller/logger 206 comprises a conventional database such as the conventional Oracle database product commercially available from Oracle Corporation of Redwood Shores, Calif., which stores each record it receives. The records may be used to bill a party for network time used or locations used or both, or may be used to log movement of each user. The accumulated bill or location of the user may be subject to limits, if a limit is exceeded, biller/logger 206 may inform master access controller 222, which logs the user off the system 200 and sends the currently communicating access controller 220 a new privileges record for the user such as the not logged in privileges record described above. Access controller substitutes the privileges record for the prior record of the user, denying access.

Figure 3A:
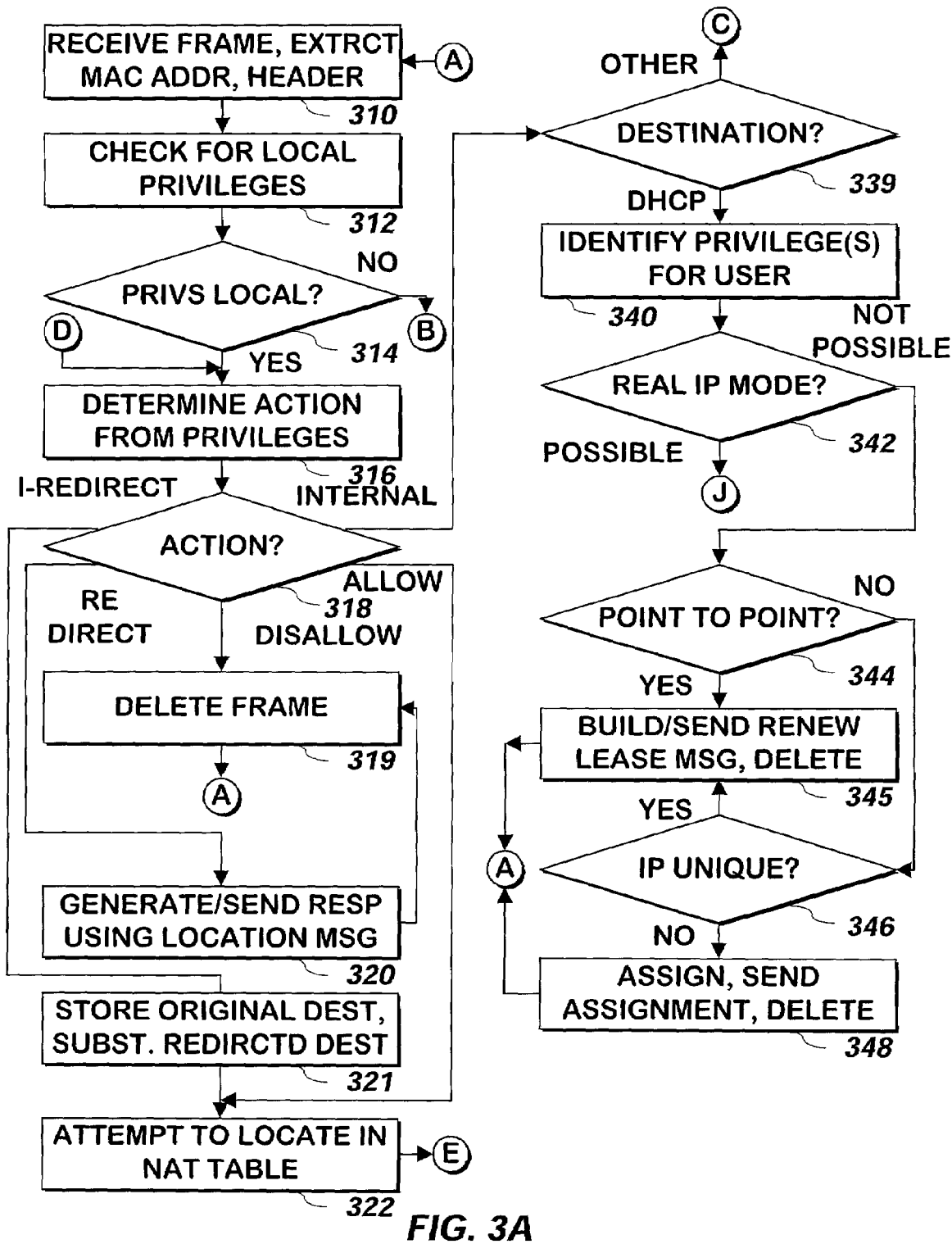
FIG. 3A is a flowchart illustrating a method of providing access to a network according to one embodiment of the present invention.

Referring now to FIGS. 3A and 3B, a method of communicating with a network is shown according to one embodiment of the present invention. A frame or other encapsulated communication is received as described above. The MAC address or other identifier of the device or user is extracted from the frame and the packet header or other similar information is extracted as described above 310. A list of local privileges is checked 312 using the MAC address or MAC address and IP address as described above. If the privileges are locally stored, the method continues at step 314, otherwise, the method continues at step 350.

The action to be taken is determined 316 from the privileges for the MAC address or MAC+IP address combination or other target as described above. If the action is to disallow the communication 318, the frame sent by the device is deleted 319 and the method continues at step 310. If the action is to redirect the communication 318, a response frame is generated back to the device containing a location command or other similar command 320 and the method continues at step 319.

If the action is an internal redirect 318, the original destination IP address and port number is stored and the redirected IP address and port is substituted in their place as described above 321 and the method continues at step 322. If the action is to allow the communication 318, the method continues at step 322.

Figure 3E:
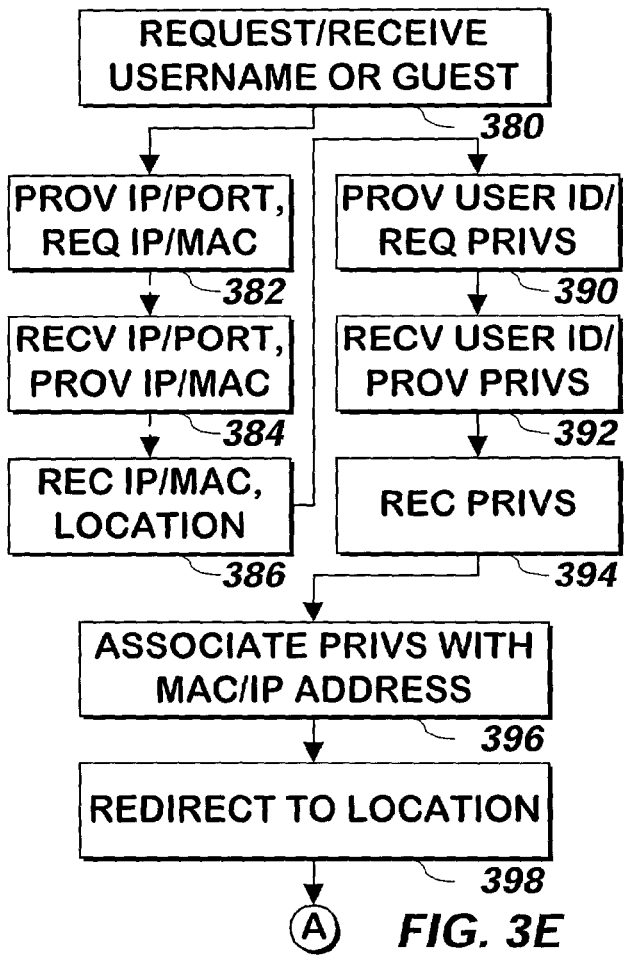
FIG. 3E is a flowchart illustrating a method of logging in a user according to another embodiment of the present invention.
Figures 3F, 3G:
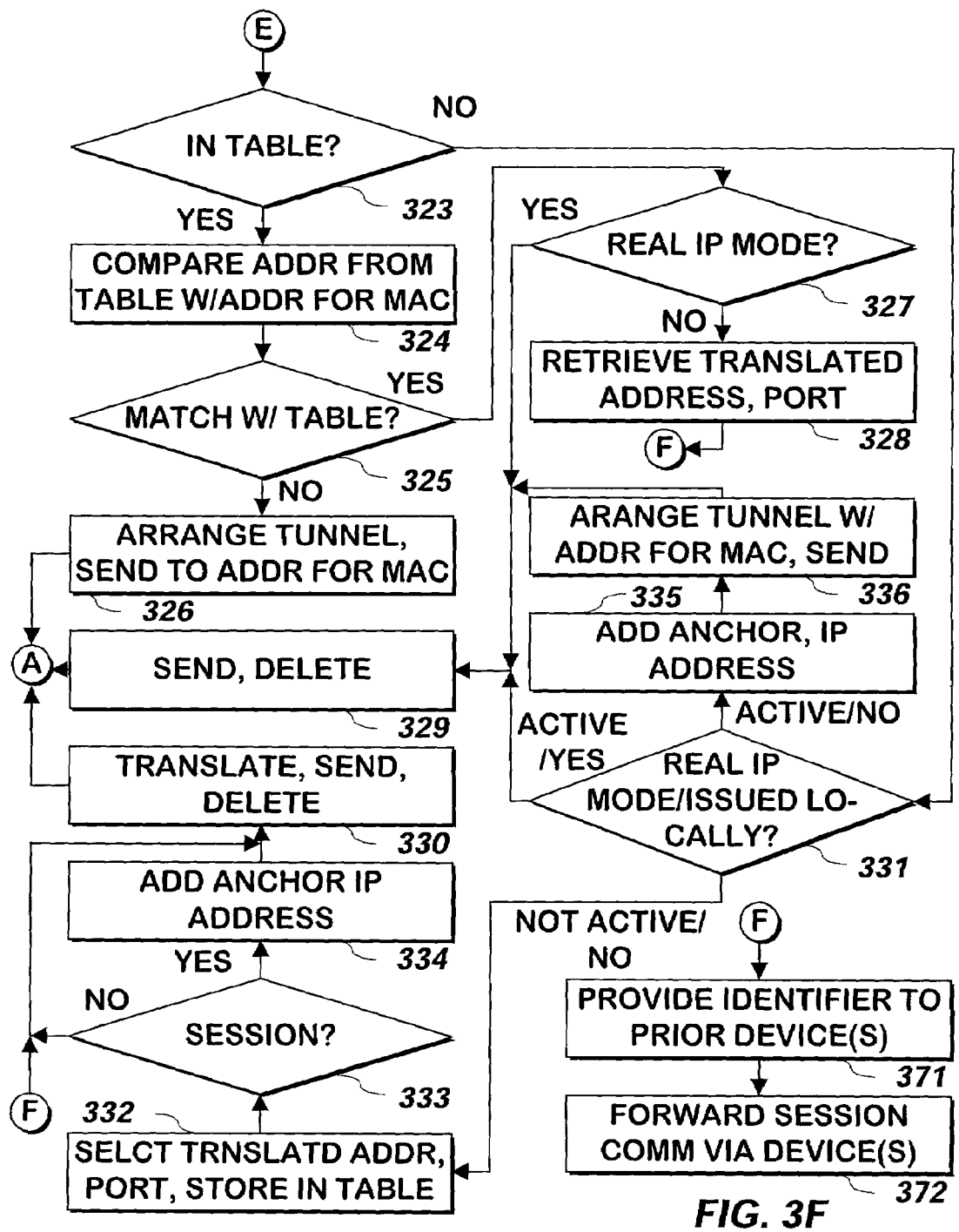
FIG. 3F is a flowchart illustrating a method of informing devices prior to the former device with which a device is in communication of an address of a new device in communication with the device and processing session communications via those former devices according to one embodiment of the present invention.
FIG. 3G is a flowchart illustrating a method of receiving session information according to one embodiment of the present invention.

At step 322, the MAC address, and source and destination IP addresses and ports are used to locate an entry in a table of address translations 322 as described above and the method continues at step 323 in FIG. 3G.

Referring now to FIG. 3G, a method of processing a frame record using a NAT table is shown according to one embodiment of the present invention. If the information is located in the table 323, the source IP address from the entry in the table containing the information is compared with the IP address stored for the MAC address 324. If the two addresses are the same 325, if the device sending the frame in step 310 has real IP mode active (e.g. has privileges, and any conditions apply and has an IP address appropriate for the subnetwork as described above) 327, a frame corresponding to the frame received in step 310 is sent 329. Otherwise 327, the translated IP address and port are retrieved from the table 328 and used to translate the source IP address and port of the frame as described above and the resulting frame is sent in the direction of the network and deleted from local storage 330. Step 310 may follow steps 329 and 330.

If the IP addresses do not match 325, some or all of the frame received in step 310 is forwarded to the address corresponding to the MAC address, such as via a tunnel as described above 326, and the method continues at step 310. If the information is not in the table 323, if real IP mode is active 331 and the IP address of the device was issued locally, the method continues at step 329. If the privileges for the user allow real IP mode under the conditions under which the packet was received, but a check of the IP address of the apparatus that was in communication with the device at the time the IP address of the device was issued to the device is different from the apparatus that received the packet 331, an entry is made into the NAT table including the MAC address and the source and destination IP addresses and ports from the frame record and the IP address of the apparatus that was in communication with the device at the time the IP address of the device was issued to the device as the anchor as described above 335 and a tunnel is arranged between the apparatii and the frame record is sent to the other apparatii as described above 336 and the method continues at step 339. Otherwise 331, a translated IP address and port number is selected from those available as described above, and the information described above is stored as a new entry in the address translation table 332. If the frame corresponds to a session 333, the address of the device initiating the session is inserted as an anchor in the NAT table 334 and the method continues at step 330 using the translated IP address and port selected in step 332, and otherwise 333, the method continues at step 330. In one embodiment, step 334 is performed unconditionally, and so step 333 is not used.

Referring again to FIG. 3A, if the action signifies the frame should be handled internally 318, if the destination indicates that the frame is a DHCP request as described above 339, one or more privileges that indicate whether a user corresponding to the device that sent the frame received in step 310 can operate in real IP mode under some or all circumstances are identified 340. If privileges for the user corresponding to the device from which the frame was received indicate that operation in real IP mode is possible 342, the method continues at step 710 of FIG. 7 and otherwise, the method continues at step 344.

Figure 7:
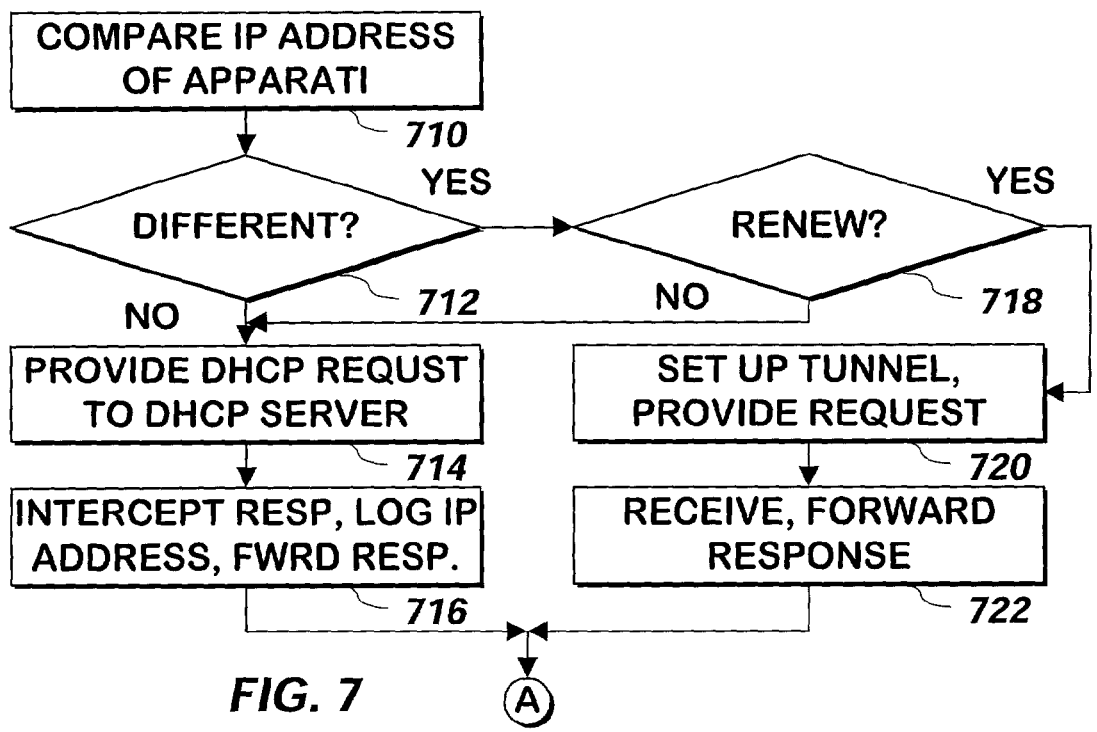
FIG. 7 is a flowchart illustrating a method of responding to DHCP requests if conditions and privileges for a device allow real IP mode according to one embodiment of the present invention.

Referring now to FIG. 7, at step 710 the IP address or other identifier of an apparatus that was in communication with the device that sent the request at the time the IP address for the device was issued is compared with the IP address or other identifier of the apparatus that received the request. If the two identifiers are different 712, if the request includes are request to renew the lease on the IP address 718, the method continues at step 720 and otherwise 718, the method continues at step 714.

At step 720, a tunnel is set up with the apparatus in communication with the device that sent the request at the time the IP address for the device was issued and the apparatus that received the request and the request is provided from the apparatus that received it to the other apparatus. A response is received over the tunnel and forwarded to the device that sent the request 722 and the method continues at step 310.

If the two identifiers are not different 712, the method continues at step 714. At step 714, a DHCP request corresponding to the frame is provided to a server 714 and any response is intercepted, the IP address is logged associated with the MAC address for the device that sent the frame record and the response is forwarded to that device 716. The method continues at step 310 of FIG. 3A.

Referring again to FIGS. 3A and 3B, at step 344, if a point to point connection is available with the requesting device as described above, a response frame indicating that the lease for the IP address is being renewed is generated and transmitted to the requesting device and the request frame received is deleted 345 and the method continues at step 310. Otherwise 344, if the IP address is unique to other devices that may receive communications for the device that sent the request 346, the method continues at step 345 and otherwise 346, an IP address is assigned that will be unique to other devices that may receive communications for the device that received the request, a response frame is generated to assign the IP address as described above and the original request is deleted 348. The method continues at step 310.

Referring now to FIG. 3B, a method of retrieving privileges and session information for a user is shown according to one embodiment of the present invention. At step 350, the frame received in step 310 is stored and timestamped as described above. A request is sent 352 to a device such as one serving multiple devices running the method of FIG. 3A to send privileges for the device having the MAC address extracted in step 310 or to send an IP address or other identifier of an apparatus that can provide them. In another embodiment, the request is sent 352 for the device having the MAC address and IP address extracted in step 310.

Figure 4A:
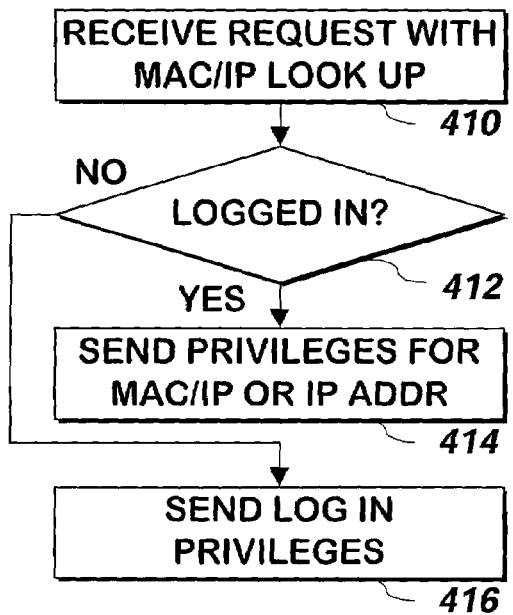
FIG. 4A is a flowchart illustrating a method of responding to a request for privileges according to one embodiment of the present invention.

Referring momentarily to FIG. 4A, a method of responding to a request for privileges is shown according to one embodiment of the present invention. The request is received 410 with either the MAC address or MAC and IP address and one or both addresses are used to identify 410 whether privileges are associated with the one or both addresses as described above. If so 412, either the IP address of an apparatus from which privileges and other information associated with the device may be retrieved, or the privileges and other information associated with the device, are sent 414 in response to the request and otherwise 412, privileges allowing log in as described herein with respect to a "not logged in" privileges record are sent in response to the request.

Referring again to FIGS. 3A and 3B, the privileges and/or IP address of the apparatus with which the device was formerly in communication may be received as part of step 352. If privileges or an address or other identifier of an apparatus from which privileges may be received are not received in time 354 as described above, the frame received in step 310 is discarded 356 and otherwise 354, the method continues at step 360.

In one embodiment, at step 360 the IP address or other identifier of a former access controller with which a user had been communicating may be received without privileges in response to the request sent in step 352 as described above. In such embodiment, if such an address is returned, the method continues at step 364 and otherwise, the method continues at step 362.

At step 362, the privileges are stored locally associated with the MAC address, IP address or both as described above and the frame or pointer stored in step 350 is retrieved and resubmitted and the method continues at step 316.

At step 364, a tunnel is set up between the apparatus performing step 352 and the apparatus corresponding to the IP address or other identifier received as part of step 352 and privileges and other information for the device that sent the frame received in step 310 are requested as described herein. Additionally, other data such as session data is requested for the device that sent the frame received in step 310 via the address received in step 358. The session data may include NAT table entries as described above as well as stored session data as described above. Such privileges and other information are received as part of step 364. Part of step 364 may include identifying itself as the apparatus to which communications directed to the device sending the frame in step 310 should be directed as described above. In one embodiment, step 364 may be performed in several substeps, with privileges and an indication of session data requested and received and if the indication of session data is positive, the tunnel is set up and session data received over the tunnel.

If receipt of an IP address or other identifier without privileges is not supported, step 362 follows step 354 if the 'yes' branch of step 354 is taken as shown by the dashed line in the Figure, and step 364 also follows step 362 as shown by the dashed line in the Figure, although in such embodiment, step 364 does not include requesting and receiving privileges.

If the other apparatus does not have such session data, none will be received 366, and the branch terminates at step 370 and otherwise 366, NAT table entries for sessions for the device and stored session data for that device are received and the receiver will update its NAT table as described above and attempt to provide 368 the stored session data to the device from which the frame was received in step 310.

As part of steps 362 and/or 364, redirect and internal redirect addresses for local devices are adjusted as described above. These are the addresses to which messages sent to generic devices such as "\\printer" will be internally redirected as described above.

The method continues at step 371 of FIG. 3F.

Referring now to FIG. 3F, a method of informing devices prior to the former device with which a device is in communication of an address of a new device in communication with the device and processing session communications via those former devices is shown according to one embodiment of the present invention. An identifier of the device receiving the communication in step 310 may be provided 371 to devices in communication with the device from which the communication was received prior to the former device as described above, such devices being identified via the network address translation table entries as described above. Session communications corresponding to the network address translation table entries are forwarded 372 to the device from which the frame was received 310 via the device receiving the frame in step 310 as described above and from the device via devices identified in the entries stored in the network address translation table received in step 368 for sessions not initiated by the device receiving the communication in step 310. The device receiving the communication in step 310 may process session communications as described in FIG. 6.

Figure 6:
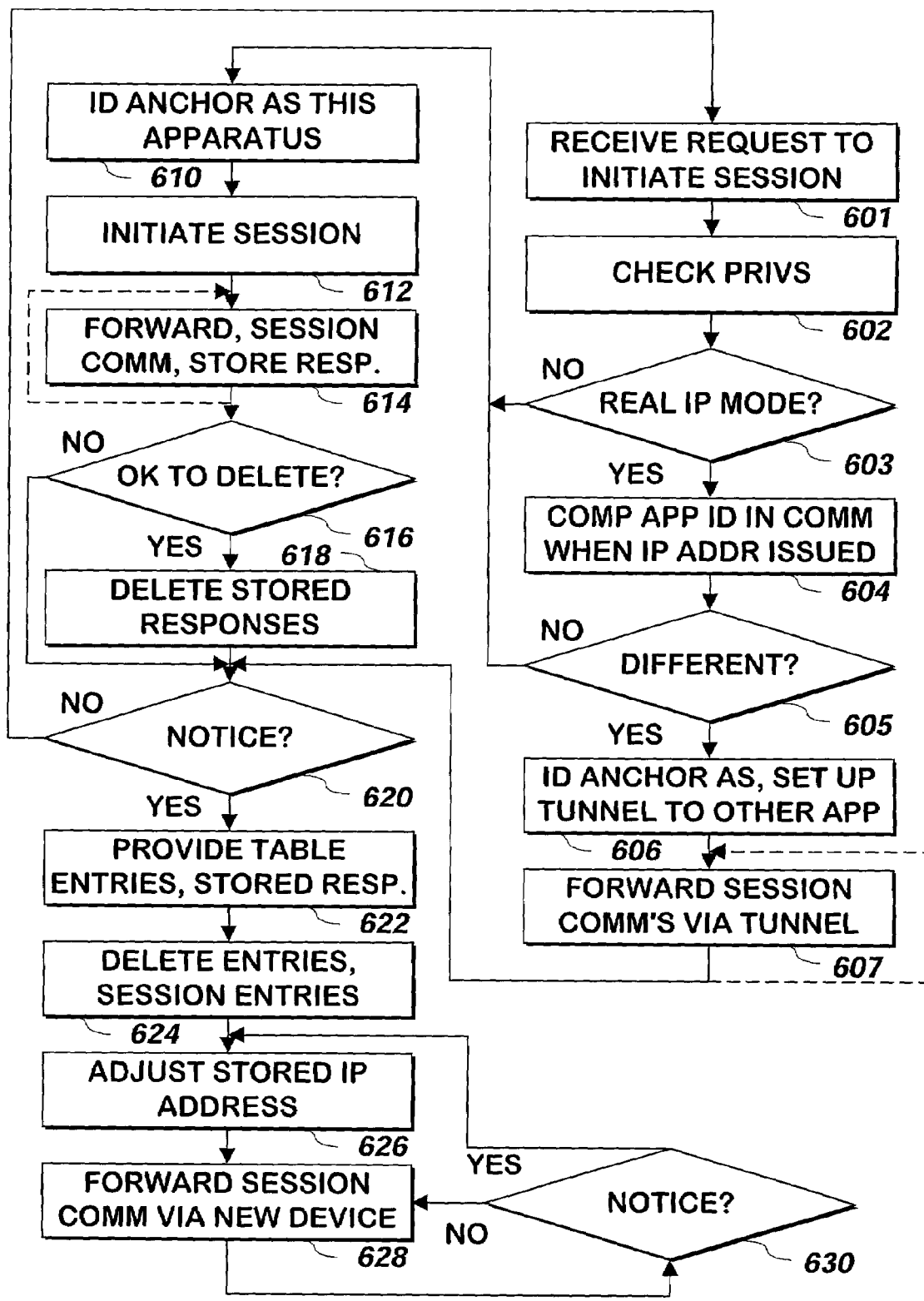
FIG. 6 is a flowchart illustrating a method of processing session communications according to one embodiment of the present invention.

Referring now to FIG. 6, a method of processing session communications is shown according to one embodiment of the present invention. A request from a first device such as a PC or other user device to initiate a session with a third device such as a session server is received at a second device 601.

Privileges of the first device are checked, including any conditions on the privileges 602. If the privileges for the first device indicate that under current conditions of the privilege, if any, the first device is permitted to operate in real IP mode 603, the method continues at step 604 and otherwise 603, the method continues at step 610. At step 604 an identifier, such as the IP address, of the second device is compared with an identifier such as the IP address of a device in communication with the first device when the first device was issued an IP address. If the two identifiers are different 605, the method continues at step 606 and otherwise 605, the method continues at step 610.

At step 606, the second device prepares a NAT table entry for the session with the address of a fifth device, the device in communication with the first device when the first device was issued an IP address as the anchor, and tunnels the request to initiate the session to the fifth device and receives session communications from the fifth device over the tunnel and forwards them to the first device 607. In one embodiment, step 607 repeats independently of the method as described above and as indicated by the dashed line in the Figure. The method continues at step 620.

At step 610, the second device adds an entry to a NAT table for the session with itself as the anchor as described above. The second device initiates a session with the third device as described above 612. The second device forwards session communications from the first device to the third device and vice versa 614 which may be repeatedly independently of the other steps in the Figure as shown by the dashed line, as described above. Communications from the third device to the first device may be optionally stored 614 as described above. If the communication forwarded was from the first device, the requester of the session, or another criteria for deletion of the stored session communications is met as described above 616, stored session communications from the third device to the first device are deleted 618 and the method continues at step 620, and otherwise 616, the method continues at step 620. It is noted that the second device may receive and forward non-session communications from the first device at step 614 as described above.

If a notice from a fourth device is received indicating that the first device is in communication with the fourth device as described above 620, the method continues at step 622 and otherwise 620, the method continues at step 614 or step 610 as indicated by the dashed line.

At step 622, table entries and stored responses are provided to the fourth device 622 as described above and non-session entries and entries for which the second device is not the anchor are deleted 624 as described above. A stored IP address for the first device is adjusted 626 to be the IP address of the device with which the first device is in communication as described above and session communications are forwarded to, and received from, the first device via the device with which the first device is in communication 628. If another notice is received that the first device has established communication with yet a sixth device 630, the method continues at step 626 for the sixth device, and otherwise, the method continues at step 628.

Referring now to FIG. 3C a method of logging in a user is shown according to one embodiment of the present invention. The method shown in FIG. 3C may be performed as a part of step 352 of FIG. 3B or as a part of a redirection as described above. If protocol in the frame received in step 310 of FIG. 3A was for a secure web page 374, the frame is internally redirected 378 as described above to a secure web page as described above and the method continues at step 380. Otherwise 374, an HTTP location command is sent back to the device that sent the frame received in step 310 directing the device to the secure web page as described above 376. In another embodiment, steps 374 and 378 are not used, the device is always sent a location command to a secure web page and FIG. 3C is an instance of steps 318 and 320 of FIG. 3A.

Steps 380–398 may be performed at a different device, such as the device from which privileges were requested in step 352 of FIG. 3B and to indicate this possibility, dashed lines lead to step 380. At step 380, a username and password or other identifier is requested and received, or an indication that the user is a guest is requested and received, for example via the secure web page described above, and the method continues at step 382. In one embodiment, if the user indicates that he or she is a guest, the username and password are both treated as if the user had typed, "guest".

At step 382, information related to the identity of the device from which the username and password or other information was received in step 380, such as the IP address and port of a different device that identifies the device from which the username and password or other information was received in step 380, is provided as described above, for example in a request for a MAC address, IP address or both, of the device. The IP address and port or other identifier provided in step 382 is received, and the MAC address, IP address or both from the device from which the username and password or other information was received in step 380 are provided in step 384 and received in step 386. Step 384 may be performed by the same system that performs steps 374–378, so dashed lines again are used into and out of step 384.

At step 390, the user identifier(s) received in step 380 are provided, for example to a separate authorization server or an authorization server and master access controller pair as described above. The server or pair receives the user identifier(s) and the privileges corresponding to that user identifier are located and returned 392 in response to the request. The privileges are received 394 along with information related to the identity of the device from which the user identifiers were entered in step 380. This may be accomplished by providing the IP address and port or an identifier of the IP address and port with the request in step 390 and receiving this identifier or an identifier corresponding to this identifier with the privileges in step 394 as described above. The method continues at step 396.

In another embodiment shown in FIG. 3D, instead of steps 390–394 following steps 382–386, steps 382 and 390 follow step 380 and step 396 follows steps 386 and 394. Otherwise, FIG. 3B operates identically to the description of FIG. 3B described herein.

In another embodiment the user may log in by interception of frames to and from a log on location such as may be used to log into an NT domain as described above. Referring now to FIG. 8A a method of intercepting packets received from a device is shown according to one embodiment of the present invention. A frame record is received 810 as described above. If privileges for the device that sent the frame record are stored, the method continues at step 818 and otherwise 812, privileges are requested 814 for the MAC or MAC and IP address in the frame record as described above and a not logged in privilege record is received and associated with the device 816 as described above. The not logged in privilege record may specify privileges to allow the device from which the frame record was received to specify a destination of a log on location or may redirect some or all communications to the log on location as described above.

The destination of the frame record is checked to determine its intended destination 818. If the intended destination is the log on location, the method continues at step 824, and otherwise, the frame record is deleted 822A and the method continues at step 810 in one embodiment or internally redirected or redirected 822B to the log on location and the method continues at step 824 in another embodiment shown by the dashed lines in the figure.

At step 824, if an entry for the device is located in a table as described above, a table entry is set up 826 as described above and the method continues at step 828 and otherwise 824, the method continues at step 828.

At step 828, if the frame record contains log on information, such as username, password, domain, credit card information or other information, some or all of the log on information is stored associated with the device from which the frame record was received 830 and the frame record is translated and forwarded as a frame or other encapsulation to the log on location 832 and the method continues at step 810.

Referring now to FIG. 8B, a method of intercepting frames received from a log on location is shown according to one embodiment of the present invention. A response is received from a log on location 850. If the response is not an indication of an approval of a log on 852, the method continues at step 860 and otherwise 852, the log on information stored at step 830 in FIG. 8A is retrieved 854 from the table as described above. Privileges are requested using some or all of the log on information 856 as described above, and privileges for a user corresponding to the log on information (which may include a domain or credit card information or other information) are retrieved, stored and associated with the device, with some or all of the log on information 858. The response is translated and provided 860 to the device as described above and the method continues at step 850.

In still another embodiment shown in FIG. 3E, one or more user identifiers are requested from a device, such as the device being used by the user in step 380 as described above and steps 374–378 are not used, and otherwise, steps 380–398 operate as described with respect to FIG. 3C.

The privileges received at step 394 are associated 396 with the MAC address, IP address or both received in step 386. In one embodiment, information about the location requested by the device before it was redirected in step 376 or internally redirected in step 378 is received at step 386, and this information may be used to redirect the user 398 via an HTTP location command as described above, and the method continues at step 310.

Figure 4B:
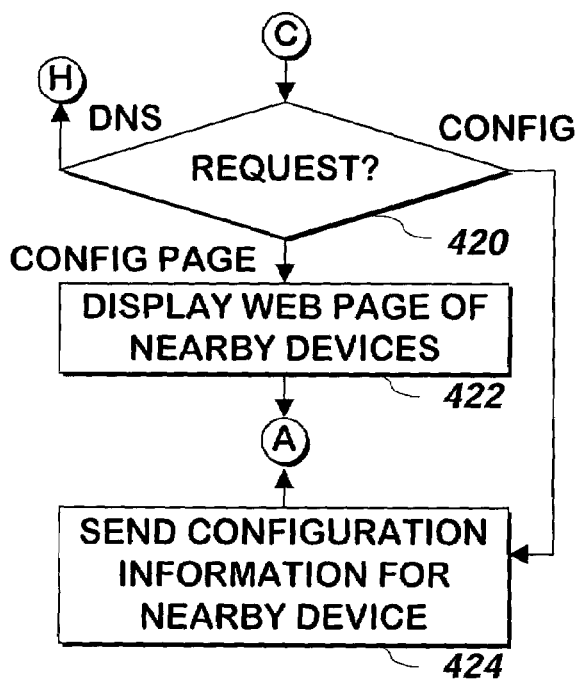
FIG. 4B is a flowchart illustrating a method of providing other internal services of FIG. 3A according to one embodiment of the present invention.

Referring now to FIGS. 3A and 4B, if the internal service is a service other than a DHCP request 339, the method continues at step 420. The request may be for a web page used to install driver software and configure a peripheral device such as a printer. If so 420, a web page is provided for listing printers nearby to the user 422 and linking to configuration capabilities as described above and the method will continue at step 310. If the user clicks on an installation link, the method will continue at step 310 until step 420 is reached again. This time, a configuration information for a nearby device corresponding to the link clicked is provided 424 as described above.

Figure 4C:
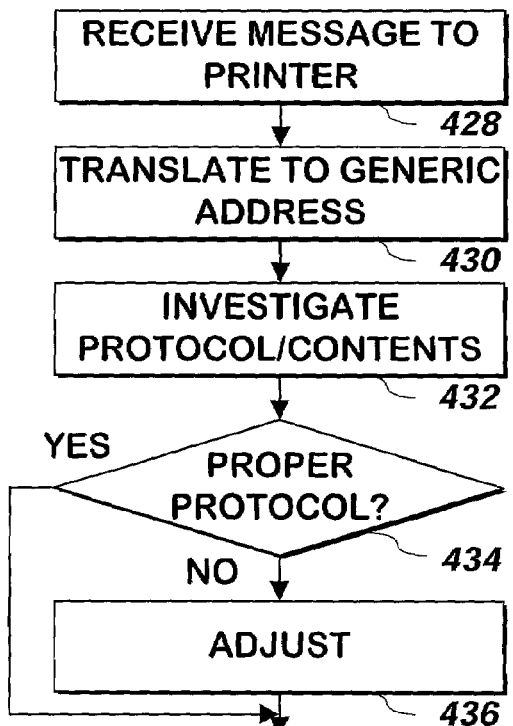
FIG. 4C is a flowchart illustrating a method of forwarding a printer message to a printer based on the location of the sender of the message and the printer according to one embodiment of the present invention.

Referring now to FIG. 4C a method of forwarding a message to a printer based on the location of the sender of the message and the location of the printer is shown according to one embodiment of the present invention. A message to a printer is received 428. Conventional DNS, SMB, NetBios or other resolution techniques are used to resolve the name to a generic IP address 430. The protocol or printer language may be investigated 432 and if the protocol is insufficient for the printer 434, it may be adjusted 436 as described above and the method continues at step 438, otherwise 434, the method continues at step 438. If proxy service is being provided, step 432 includes investigating the contents of the frame to identify whether a response is required, and if a response is required 438, a response is generated 440 as described above and the method continues at step 442 and otherwise 438, the method continues at step 442. A nearby printer is identified 442 and the message is sent 444 to the nearby printer identified.

Referring now to FIGS. 4B and 4D, if the internal service is a DNS request 420, the method continues at step 450. If the DNS request contains the name of a generic device 450, an address of a local device such as a printer, fax server, disk drive or other destination is selected 452 from multiple such devices of the class specified by the generic device. The address selected may be a nearby device in the class of devices specified or may be the nearest device in the class, such as the device in the class nearest to the access controller receiving and processing the DNS request. The address selected is provided in response to the DNS request 454 and the method continues at step 310. Otherwise 450, some or all of the DNS request may be forwarded to the DNS server specified in the request or to another DNS server, using the source IP address and port in the request (for example, if the user is operating in real IP mode) or a translated IP address and port number as described herein, and the method continues at step 310. In one embodiment, steps 452 and 454 may be provided in part by a DNS server as described above.

Figure 5:
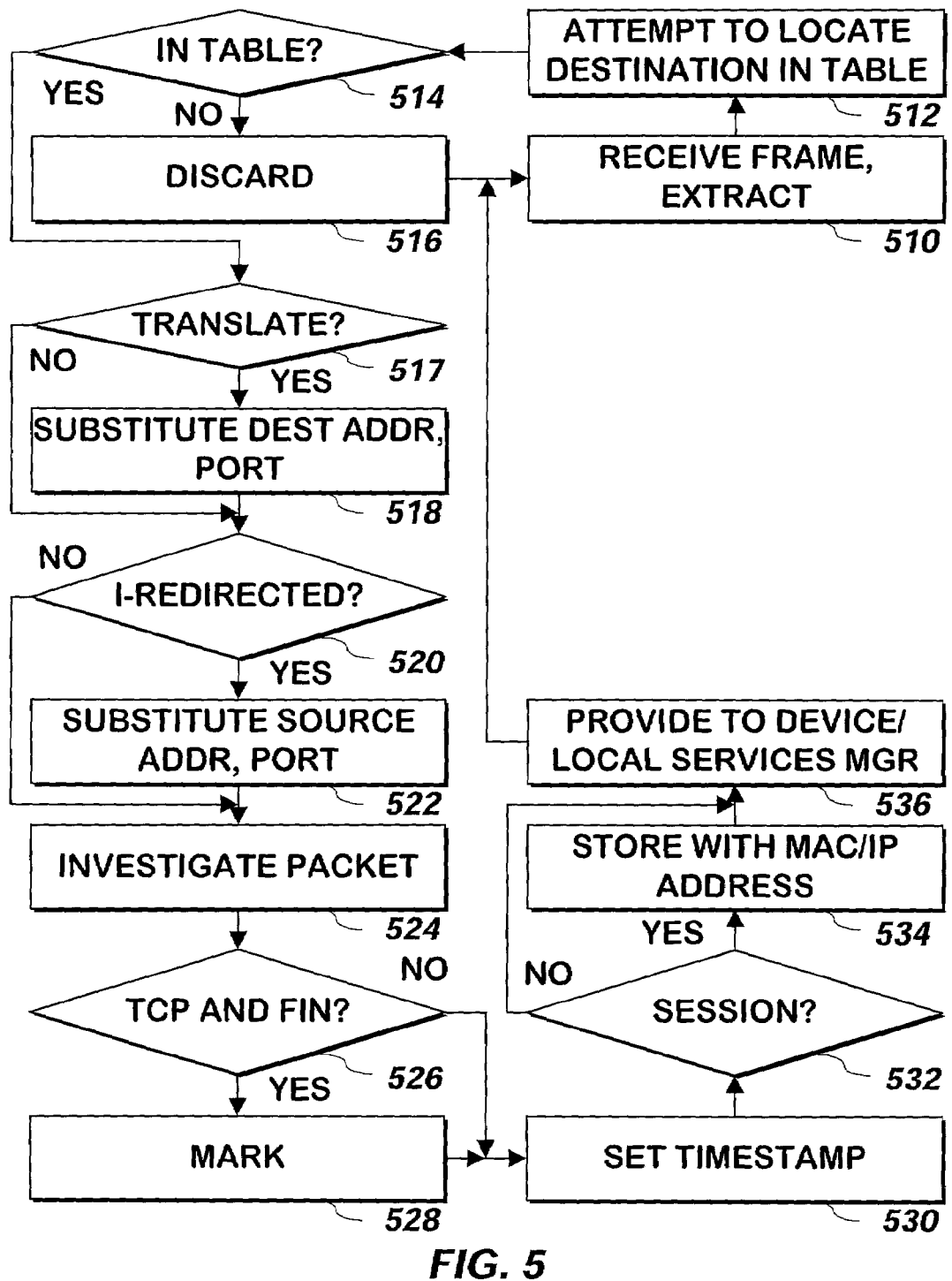
FIG. 5 is a flowchart illustrating a method of forwarding a response to a device that sent the message triggering the response according to one embodiment of the present invention.

Referring now to FIG. 5, a method of forwarding a response to a device that sent a message corresponding to the response is shown according to one embodiment of the present invention. A frame containing the response is received over a network and header information describing the destination of the frame is extracted 510 as described above. An attempt is made 512 to locate the destination of the frame (e.g. IP address and port) matching an entry in a table of entries that was used to translate the message corresponding to the response as described above. If the destination is not located in the table 514, the frame is discarded 516 as described above. If the destination is located in the table 514, if the located entry was marked do not translate 517, the method continues at step 520 and otherwise 517, the source IP address and port that was originally in the message is substituted 518 for the destination IP address and port that is in the frame containing the response. If the located entry in the table indicates that the message to which the response corresponds was internally redirected 520, the original destination address and port number of the message in the located entry from the table is substituted 522 for the source IP address and port of the response frame and the method continues at step 524. Otherwise 520, the method continues at step 524.

The packet is investigated 524 to identify whether the frame received in step 510 contained a TCP packet with the FIN flag set and if the packet or other encapsulation in the frame corresponds to a session as described above. If so 526, the located entry in the table is marked 528 to allow earlier deletion of the located entry as described above and the method continues at step 530. If not 526, the method continues at step 530.

At step 530, the located entry in the table is timestamped 530 as described above. In an alternate embodiment of the present invention, rather than mark the entry 528 and timestamp it 530, an expiration date and/or time is assigned to the entry that is shorter if the frame contained a TCP packet having the FIN flag set and longer if it does not.

If the investigation of the packet in step 524 indicated the packet corresponded to a session 532 as described above, information from the frame received in step 510 is stored 534 with the MAC address, IP address or both of the device that sent the message as described above and the method continues at step 536 and otherwise 532, the method continues at step 536. At step 536, a frame corresponding to the frame, modified as described above, is provided 536 to the device or local services manager acting as a proxy as described above and the method continues at step 510.

Referring now to FIG. 9A, a method of responding to an address resolution protocol request is shown according to one embodiment of the present invention. An address resolution protocol request requesting the MAC address of a second device is received at a first device 910, different from the second device. The first device provides its own MAC address in response to the request 912 without regard to any of the information, such as IP address, contained in the request. As such, the response is said to be provided "requestlessly".

Referring now to FIG. 9B, a method of providing a frame is shown according to one embodiment of the present invention. An IP address of a gateway is received 920. The MAC address of the gateway is obtained, for example by requesting it in an ARP request using the IP address received in step 920 as described above.

ARP messages are monitored and an ARP table is maintained as described above 924. Step 924 may be part of a continuously running and/or independent process as indicated by the dashed line in the Figure.

A frame record is received as described above 930. An attempt is made to locate 932 the destination IP address in the frame record in the ARP table maintained in step 924. If the IP address is located in the table 934, the MAC address corresponding to the located IP address is retrieved and a frame is built with the MAC address retrieved and provided onto a network 936 and the method continues at step 930.

If the destination IP address of the frame record is not located in the table 934, the method continues at both steps 938 and 940. At step 938 an ARP request for the destination IP address from the frame record is built and provided. If a response is received, the operation of step 924 will cause an entry to be added to the ARP table containing the IP address and the MAC address of the device that responded to the ARP request provided in step 938.

At step 940, the frame record is timestamped and added to a list or queue. The queue or list is monitored and differences between the timestamps of the entries in the queue or list and the current time are calculated 942. If the difference exceeds a threshold, 944, another attempt is made to locate the destination IP address in the table 946, and otherwise, the method continues at step 942.

If the destination IP address is located in the table 944, the method continues at step 936 and otherwise 944, the method continues at step 960.

In another embodiment, step 924 includes initiating step 936 for entries in the queue/list for that IP address when an ARP response is received, and so step 960 follows the "yes" branch of step 944 and steps 946 and 948 are not used.

At step 960 a gateway privilege is optionally checked to determine whether the device that sent the frame record has privileges to use the gateway as described above. If not 962, an entry in a NAT table corresponding to the frame may be optionally removed 964 and the frame record is deleted 970 and the method continues at step 930. In one embodiment, step 930 includes sending a response frame to the device that sent the frame corresponding to the frame record informing the user of the device that access to the network is denied. If the user has privileges to use the gateway 962, the MAC address of the gateway is retrieved, for example from the ARP table by using the IP address of the gateway as an index to the table, the MAC address of the gateway and the frame record are used to build the frame 964 the frame is provided onto a network and the method continues at step 930.

Figure 10:
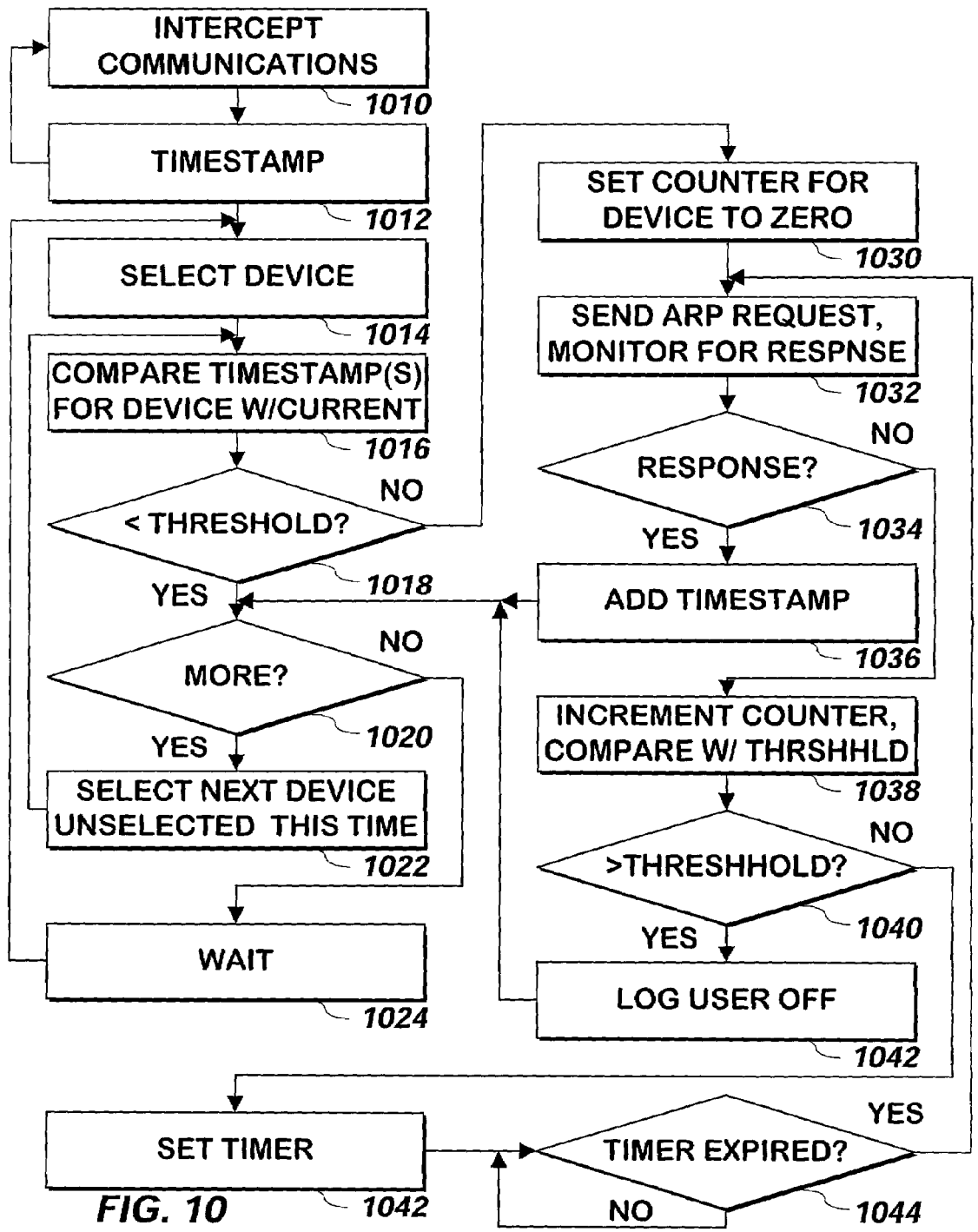
FIG. 10 is a flowchart illustrating a method of logging off a device or user according to one embodiment of the present invention.

Referring now to FIG. 10, a method of logging off a device or a user is shown according to one embodiment of the present invention. Communications to the device, from the device or both are intercepted 1010 and timestamped 1012 as described above in a continuously running process. In a separate process, a device is selected 1014, for example by selecting an entry in a NAT table or a privileges record. One or more timestamps, including those corresponding to some or all of the intercepted communications, are compared with the current date and/or time 1016. If the difference between the most recent timestamp for the device and the current timestamp exceeds a threshold 1018, the method continues at step 1030 and otherwise, 1018, the method continues at step 1020. At step 1020, if there are more devices not selected since the most recent occurrence of step 1014, another such device is selected 1022 and the method continues at step 1016, and otherwise 1020, the process of the method containing step 1020 may optionally wait and repeat at step 1014.

At step 1030, a counter for the selected device is initialized to zero and a request for a response that is automatically responded to by the device without user input, such as an ARP request, is sent to the selected device and any response received is monitored 1032. If a response is received 1034, a the current date and/or time is used to timestamp the device selected 1036 and the method continues at step 1020. Otherwise, the counter for the device is incremented and compared with a threshold If the counter exceeds the threshold 1040, the user is logged off as described above 1042 and the method continues at step 1020 and otherwise 1040, a timer is set 1042 and monitored 1044 and when the timer expires 1044, the method continues at step 1032.

In one embodiment, steps 1030–1044 are part of an independently running process. If the no branch of step 1018 is taken, the device is marked and the method continues at step 1020. The process in steps 1030–1044 operate on the marked device in place of the selected device.

What is claimed is:

1. A method of forwarding a communication, comprising:
    receiving for each of a plurality of users an indication having one selected from a first state and a second state;
    receiving the communication having a source identifier;
    retrieving at least one of said indications;
    responsive to the at least one indication retrieved having the first state, forwarding the communication with the source identifier received with the communication; and
    responsive to the at least one indication retrieved having the second state, forwarding the communication with an alternate source identifier different from the source identifier received with the communication.

2. The method of claim 1 wherein the at least one indication is retrieved responsive to at least one selected from the source identifier and an alternate identifier sent with the communication.

3. The method of claim 2 wherein the alternate identifier comprises a MAC address.

4. The method of claim 1, wherein the source identifier comprises an IP address.

5. The method of claim 1 wherein the communication comprises a packet.

6. The method of claim 1 wherein the alternate source identifier comprises an identifier of a device forwarding the communication.

7. The method of claim 1, wherein the communication is received at a device that provides access to a network for the communication.

8. The method of claim 1, wherein
    the forwarding step is performed over a network responsive to the indication retrieved having the first state; and
    the forwarding step is performed over the network responsive to the indication retrieved having the second state.

9. A system for forwarding a communication, comprising:
    a privileges requester having a privileges input operatively coupled for receiving for each of a plurality of users, an indication having one selected from a first state and a second state, the privileges requester for providing at an output at least one of the indications;
    an access point manager having an input operatively coupled for receiving the communication having at least one selected from a source identifier and an alternate identifier, the access point manager for building and providing at an output a second communication responsive to the first communication; and
    a network address translation manager having a communication input coupled to the access point manager for receiving at least a portion of the second communication, and a privileges input coupled to the privileges requester output for receiving the at least one indications, the network address translation manager for providing at an output a third communication comprising:
        at least a portion of the source identifier, responsive to at least one of the at least one indications received at the privileges requester input having the first state; and
        a third source identifier responsive to at least one of the at least one indications received at the privileges requester input having the second state.

10. The system of claim 9, wherein:
    the privileges requester additionally has an identifier input, the at least one of the indications provided at the privileges requester output responsive to the privileges requester identifier input; and the network address translation manager additionally comprising an identifier output coupled to the privileges requester input, the network address translation manager additionally for providing at the identifier output at least one selected from the source identifier and the alternate identifier.

11. The system of claim 9, wherein the source identifier comprises an IP address.

12. The system of claim 9 wherein the alternate identifier comprises a MAC address.

13. The system of claim 9 wherein the communication comprises a packet.

14. The system of claim 9 wherein the alternate source identifier comprises an identifier of a device forwarding the communication.

15. The system of claim 9, wherein the communication is received at a device that provides access to a network for the communication.

16. The system of claim 9, wherein:

the network address translation manager provides the third communication to a network responsive to the indication retrieved having the second state; and the network address translation manager provides the third communication to the network responsive to the indication retrieved having the first state.

17. A computer program product comprising a computer useable medium having computer readable program code embodied therein for forwarding a communication, comprising computer readable program code devices configured to cause a computer to:

receive for each of a plurality of users an indication having one selected from a first state and a second state;

receive the communication having a source identifier;

retrieve at least one of said indications;

responsive to the at least one indication retrieved having the first state, forward the communication with the source identifier received with the communication; and responsive to the at least one indication retrieved having the second state, forward the communication with an alternate source identifier different from the source identifier received with the communication.

18. The computer program product of claim 17 wherein the at least one indication is retrieved responsive to at least one selected from the source identifier and an alternate identifier sent with the communication.

19. The computer program product of claim 18 wherein the alternate identifier comprises a MAC address.

20. The computer program product of claim 17, wherein the source identifier comprises an IP address.

21. The computer program product of claim 17 wherein the communication comprises a packet.

22. The computer program product of claim 17 wherein the alternate source identifier comprises an identifier of a device forwarding the communication.

23. The computer program product of claim 17, wherein the communication is received at a device that provides access to a network for the communication.

24. The computer program product of claim 17, wherein:

the forwarding is performed over a network responsive to the indication retrieved having the first state; and the forwarding is performed over the network responsive to the indication retrieved having the second state.

25. An apparatus for forwarding a communication, comprising:

means for receiving for each of a plurality of users an indication having one selected from a first state and a second state;

means for receiving the communication having a source identifier;

means for retrieving at least one of said indications; and means for:

responsive to the at least one indication retrieved having the first state, forwarding the communication with the source identifier received with the communication; and responsive to the at least one indication retrieved having the second state, forwarding the communication with an alternate source identifier different from the source identifier received with the communication.

26. The apparatus of claim 25, wherein:

the forwarding is performed over a network responsive to the indication retrieved having the first state; and the forwarding is performed over the network responsive to the indication retrieved having the second state.

* * * * *